United States Patent [19]
Washisu et al.

[11] Patent Number: 5,826,115
[45] Date of Patent: Oct. 20, 1998

[54] CAMERA WITH AN IMAGE STABILIZING FUNCTION

[75] Inventors: Koichi Washisu, Tokyo; Toru Nagata, Yokohama; Hiroshi Sumio, Tokyo; Masao Shikaumi, Yokohama, all of Japan

[73] Assignee: Canon Kabushiki Kaisha, Tokyo, Japan

[21] Appl. No.: 906,108

[22] Filed: Aug. 5, 1997

Related U.S. Application Data

[63] Continuation of Ser. No. 180,799, Jan. 10, 1994, abandoned, which is a continuation of Ser. No. 813,055, Dec. 23, 1991, abandoned, which is a continuation of Ser. No. 653,748, Feb. 11, 1991, abandoned, which is a continuation of Ser. No. 555,361, Jul. 18, 1990, abandoned, which is a continuation of Ser. No. 430,056, Oct. 31, 1989, abandoned, which is a continuation of Ser. No. 271,598, Nov. 15, 1988, abandoned.

[30] Foreign Application Priority Data

Nov. 16, 1987 [JP] Japan .................................. 62-289136
Jan. 28, 1988 [JP] Japan .................................. 63-18208

[51] Int. Cl.$^6$ .................................................. G03B 17/00
[52] U.S. Cl. .............................................................. 396/55
[58] Field of Search .................................. 359/554–557; 348/219, 142, 169, 369, 208, 211, 213; 396/52–55

[56] References Cited

U.S. PATENT DOCUMENTS

| 3,164,838 | 1/1965 | Heinrich ................................ 348/213 |
| 3,944,324 | 3/1976 | Tajima .................................. 350/500 |
| 3,984,628 | 10/1976 | Sharp .................................... 348/211 |
| 4,244,006 | 1/1981 | Kitahara et al. ...................... 348/213 |
| 4,623,930 | 11/1986 | Oshima et al. ................... 354/430 X |
| 4,731,669 | 3/1988 | Hayashi et al. ...................... 348/208 |
| 4,746,206 | 5/1988 | Kusztos et al. .................. 350/500 X |
| 4,780,739 | 10/1988 | Kawakami et al. ................ 354/65 X |
| 4,788,596 | 11/1988 | Canon .................................. 358/222 |

*Primary Examiner*—W. B. Perkey
*Attorney, Agent, or Firm*—Fitzpatrick, Cella, Harper & Scinto

[57] ABSTRACT

A camera has an image stabilizing function which is provided with vibration correcting means for driving an imaging system in at least two non-parallel directions and correcting the vibration of an image, and control means for selecting one of the directions in which the imaging system is driven by the vibration correcting means and controlling the vibration correcting means so that only the action of the vibration correcting means in that direction is singly stopped or that the imaging system is driven at a desired speed only in that direction.

24 Claims, 22 Drawing Sheets

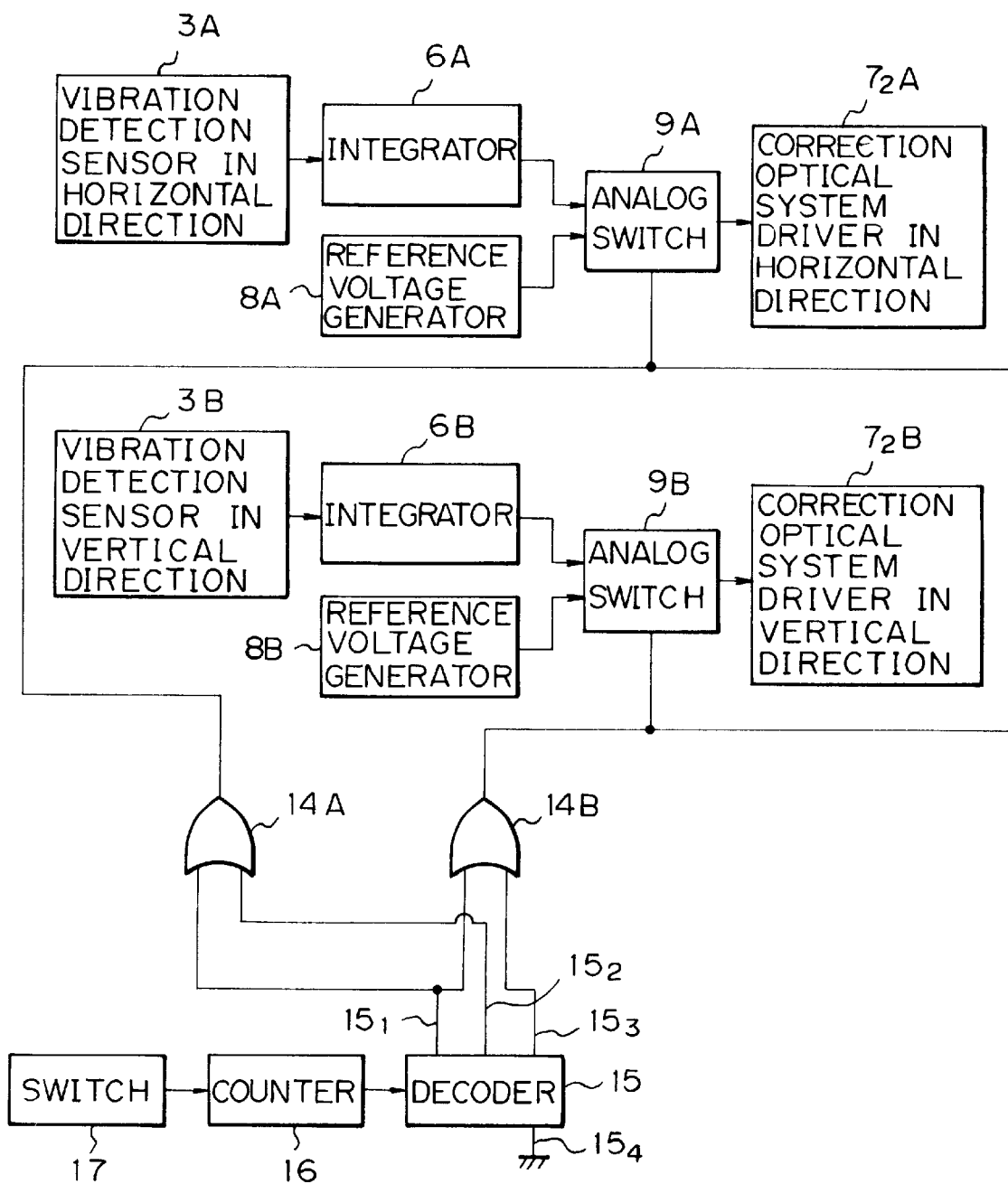

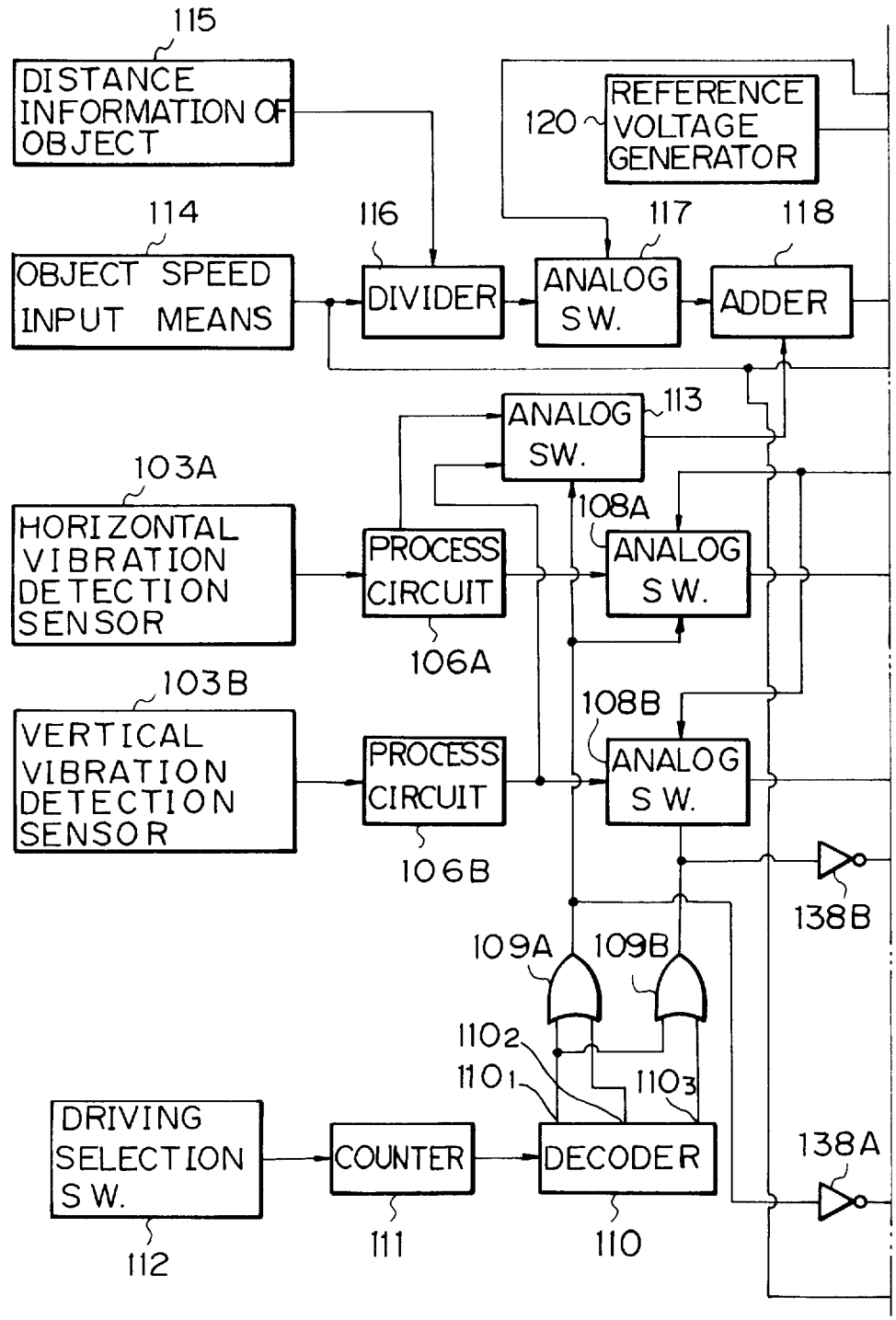

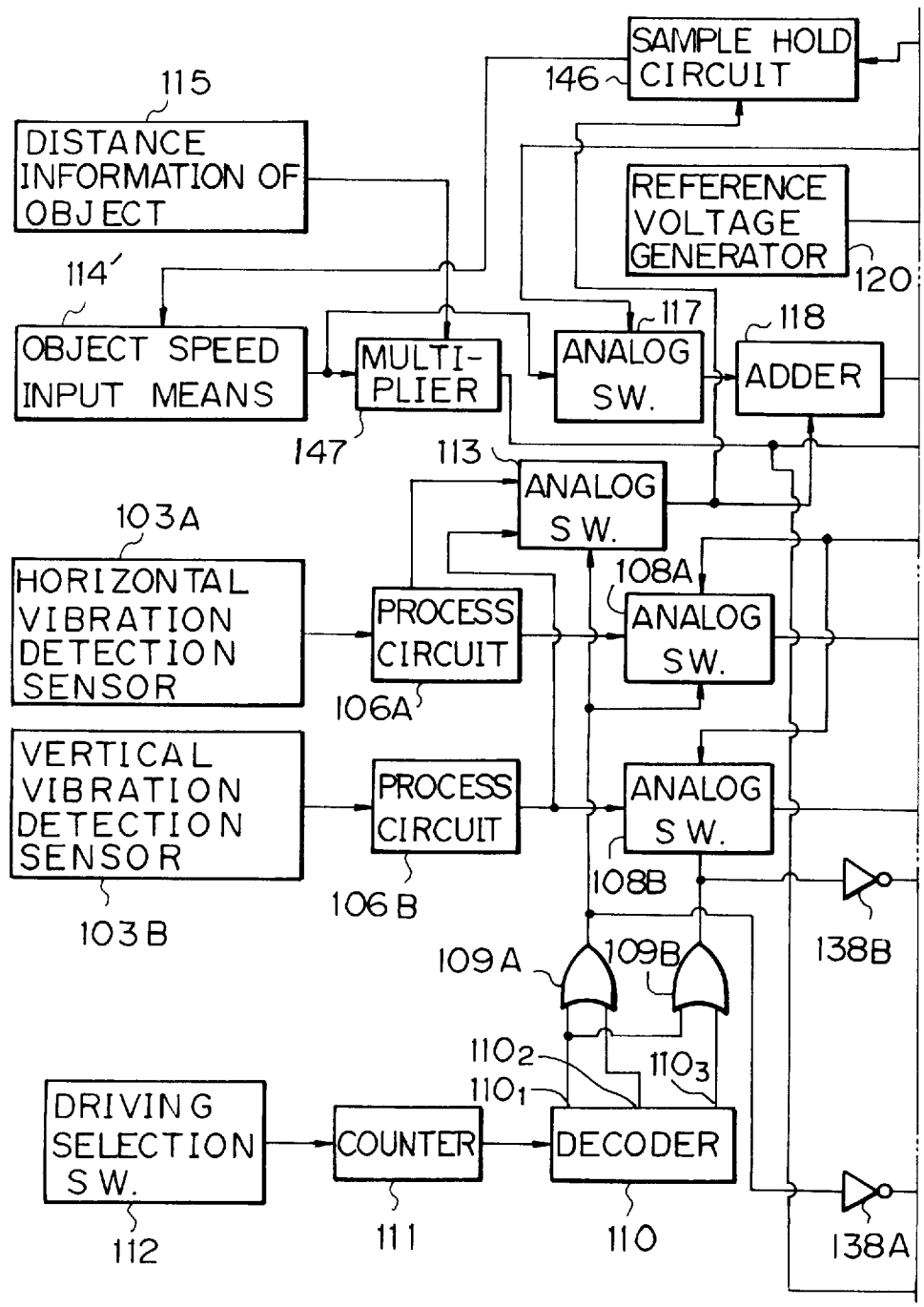

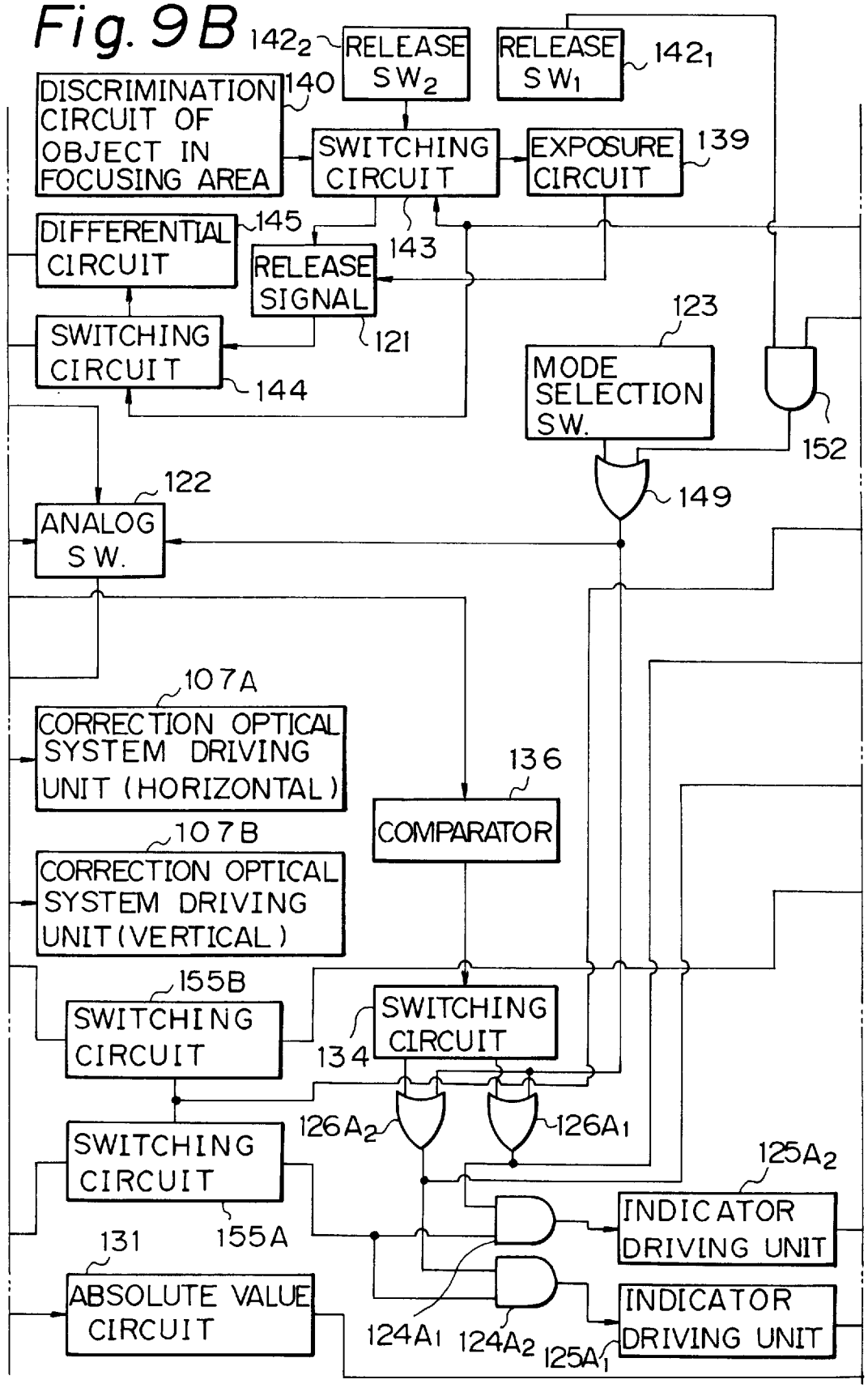

CAMERA WITH AN IMAGE STABILIZING FUNCTION

This application is a continuation of application Ser. No. 08/180,799 filed Jan. 10, 1994, which is a continuation of application Ser. No. 07/813,055 filed Dec. 23, 1991, which is a continuation of application Ser. No. 07/653,748 filed Feb. 11, 1991, which is a continuation of application Ser. No. 07/555,361 filed Jul. 18, 1990, which is a continuation of application Ser. No. 07/430,056 filed Oct. 31, 1989, which is a continuation of application Ser. No. 07/271,589 filed Nov. 15, 1988, all now abandoned.

BACKGROUND OF THE INVENTION

1. Field of the Invention

This invention relates to an image stabilizing camera in which camera-shake is detected by a camera vibration detection sensor mounted on the camera and a freely movable correction optical system can be suitably driven in conformity therewith, whereby an image free from the influence of camera-shake is obtained and which is provided with a device for simply taking a photograph by panning the camera with the object.

2. Related Background Art

In modern cameras, important works for photographing such as exposure determination and focusing are all automatized and, therefore, the possibility of any person unskilled in camera manupulation, the chance of failing in photographing is very small, but the failure in photographing due to camera vibration cannot be automatically prevented.

For this reason, recently, cameras which can prevent even the failure in photographing attributable to camera vibration have been studied and particularly, development and, studies of cameras which can prevent the failure in photographing attributable to hand vibration of the photographer have been set forward.

The above-mentioned vibration is usually a vibration of a frequency within 1 Hz–12 Hz, and, in order that a photograph free from image vibration may be taken even if such hand vibration occurs at the point of time whereat the camera shutter is released, it is necessary that the camera-shake resulting from said hand vibration be detected and the correction optical system be displaced in conformity with the detected value and with the direction of vibration displacement of the camera. Accordingly, to achieve said object (that is, to take a photograph free from image vibration even if vibration of the camera occurs), it is necessary to detect the vibration of the camera (particularly, the vibration resulting from hand vibration) accurately.

In principle, detection of camera vibration can be accomplished by carrying on the camera, a camera vibration detecting system including an accelerometer outputting an acceleration signal and an integrator for integrating the acceleration signal in one stage or in two stages and outputting a speed signal or a displacement signal.

The outline of a camera-shake detecting system using an accelerometer will hereinafter be described with reference to FIG. 11 of the accompanying drawings.

FIG. 11 shows a system for detecting vertical vibration in the direction of arrow relative to the camera, and in this figure, a horizontal vibration detecting system with respect to a direction perpendicular to the plane of the drawing sheet is omitted. The terms "vertical" and "horizontal" used herein are not "vertical" and "horizontal" in the absolute sense of the words, but are "vertical" and "horizontal" relative to the central axis of the camera.

In FIG. 11, the reference numeral 1 designates a camera body, the reference numeral 2 denotes a lens barrel, and the reference characters $3a_1$ and $3b_1$ designate two accelerometers capable of detecting minute acceleration, such as servo accelerometers, and the acceleration detection directions thereof are indicated by $3a_2$ and $3b_2$. Similar accelerometers can also be used for the detection of the horizontal vibration of the camera, but in such case, the acceleration detection directions are at right angles to the arrows $3a_2$ and $3b_2$, i.e., perpendicular to the plane of the drawing sheet.

The reference numeral 5 denotes a differential amplifier for taking the differential of the outputs of the two accelerometers $3a_1$ and $3b_1$, and the reference numeral 6 designates a conventional analog integrating circuit (hereinafter simply referred to as the integrating circuit). This integrating circuit 6 integrates the differential acceleration signal from the differential amplifier 5 in one stage or in two stages and converts it into a hand vibration speed or hand vibration displacement. The reference numeral 7 denotes a correction optical system, and the direction of driving for the prevention of the vertical vibration of the camera in the direction of arrow 4 indicated in FIG. 11 is indicated by $7_1$. Also, for the prevention of the horizontal vibration of the camera, the direction at right angles with respect to the direction $7_1$, i.e., the direction perpendicular to the plane of the drawing sheet, is the direction of driving.

The operation of the above-described camera vibration detecting system will now be described.

Let it be assumed that the photographer levels his camera and begins to aim at an object to be photographed. At this time, the camera vibrates minutely in the direction of arrow 4 and the direction perpendicular to the plane of the drawing sheet. This vibration is a vibration of a frequency of 1 Hz–12 Hz.

When the camera-shakes in the direction of the arrow 4, different vibration accelerations are input to the accelerometers $3a_1$ and $3b_1$. This is because when the camera vibrates about a point O shown in FIG. 11, the acceleration thereof is applied more greatly to the accelerometer $3a_1$ far from the point O than to the accelerometer $3b_1$ near to the point O. By finding the difference between the outputs of the two accelerometers $3a_1$ and $3b_1$ by the differential amplifier 5, there is obtained an acceleration signal produced when the camera vibrates in the direction of the arrow 4 (vertical vibration). This signal is integrated by the integrator 6 and, thereby, converted into a camera hand vibration speed or hand vibration displacement.

The driving of the correction optical system 7 is effected by a conventional speed control system or displacement control system, and in the case of displacement control, the integrator 6 is a two-stage integrator and the correction optical system 7 is driven by the hand vibration displacement signal from the integrator 6, and in the case of speed control, the integrator 6 is a one-stage integrator and the correction optical system 7 is driven by the hand vibration speed signal from the integrator 6, and the final movement of the correction optical system 7 is made into the same wave form as hand vibration and opposite or identical in phase to hand vibration, whereby the image stabilizing effect is obtained.

The reason why there are two phases, i.e., the opposite phase and the identical phase to hand vibration in the driving of the correction optical system 7 is that depending on the optical system of the entire lens, there may be a case where the image stabilizing effect is obtained by driving the optical system in the opposite phase and a case where the image stabilizing effect is obtained by driving the optical system in the identical phase.

However, when the photographer uses an image stabilzing camera provided with the image stabilizing system with the construction as shown in FIG. 11 for photographing with panning while pursuing an object in aerophotography or at a car race, the acceleration sensor detects even the acceleration of panning and moves the correction optical system 7 and corrects it, and this leads to the problem that the effect of panning, i.e., "freezing" the background, is not obtained.

Further, also when there occurs a great change in the posture of the camera as during panning, the acceleration sensor detects the change and drives the correction optical system 7. However, the stroke of the correction optical system 7 is not so great as it follows such a great change in the posture and therefore, the correction optical system 7 is stopped at the limit of the stroke and therefore, even if an attempt is made to resume photographing after the termination of panning, the correction optical system 7 will no longer move, thus resulting in the problem that the image stabilizing effect is not obtained.

SUMMARY OF THE INVENTION

The present invention has been made in view of the above-noted situations and intends to provide a camera with the image stabilizing function which is provided with vibration correcting means for driving an imaging system in at least two non-parallel directions and correcting the vibration of an image, and control means for selecting one of the directions in which the imaging system is driven by the vibration correcting means and controlling the vibration correcting means so that only the action of the vibration correcting means in said one direction is singly stopped or that said imaging system is driven at a desired speed only in said one direction and which can suitably accomplish a photographic panning with the object.

Other objects of the present invention will become apparent from the following detailed description of some embodiments thereof taken in conjunction with the accompanying drawings.

BRIEF DESCRIPTION OF THE DRAWINGS

FIGS. 1, 1A, and 1B show a circuit diagram of an image stabilizing camera according to a first embodiment of the present invention.

FIGS. 5, 5A, 5B, and 5C illustrate a fourth embodiment of the present invention.

FIGS. 6, 6A, 6B, and 6C illustrate a fifth embodiment of the present invention.

FIGS. 7, 7A, 7B, and 7C illustrate a sixth embodiment of the present inventions.

FIGS. 8, 8A, 8B, and 8C illustrate a seventh embodiment of the present invention.

FIGS. 9, 9A, 9B, and 9C illustrate an eighth embodiment of the present invention.

FIGS. 10, 10A, 10B, and 10C illustrate a ninth embodiment of the present invention.

DESCRIPTION OF THE PREFERRED EMBODIMENTS

Figure 1B:
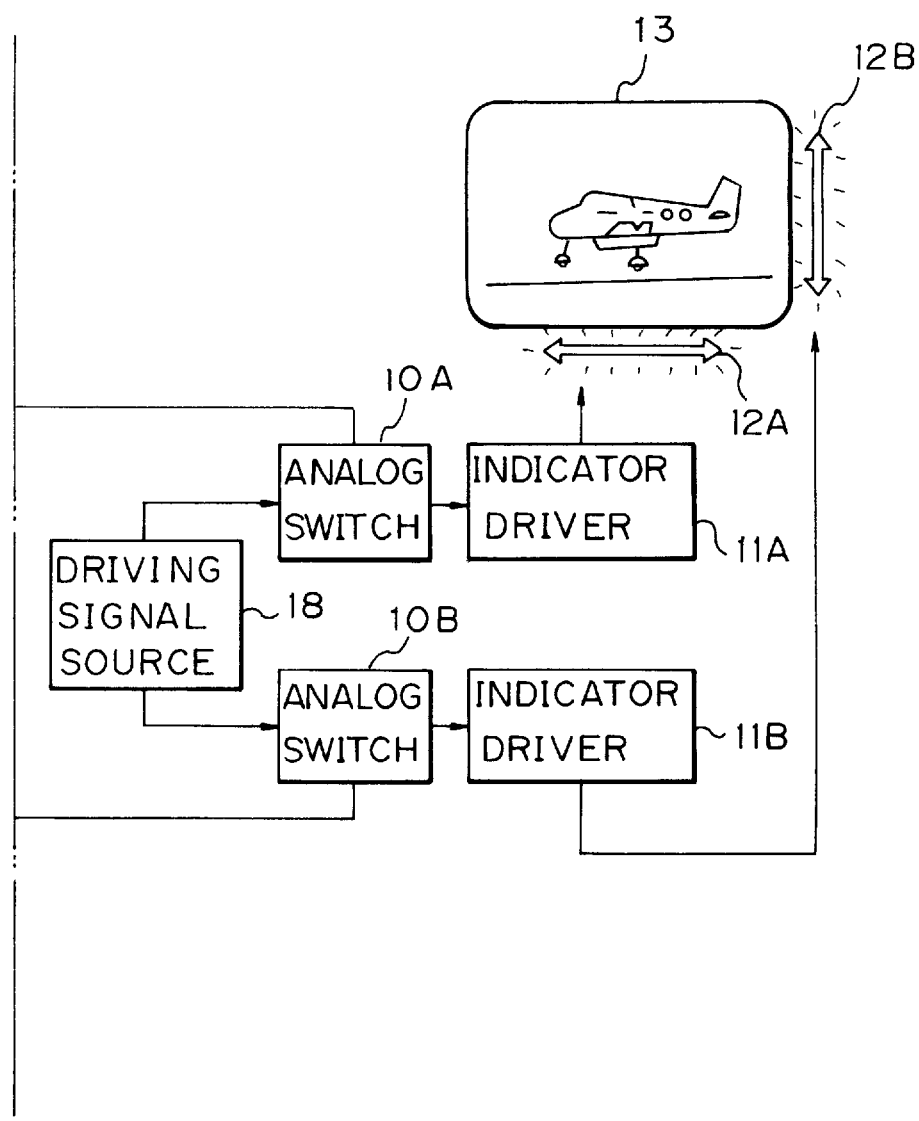
Figure 2:
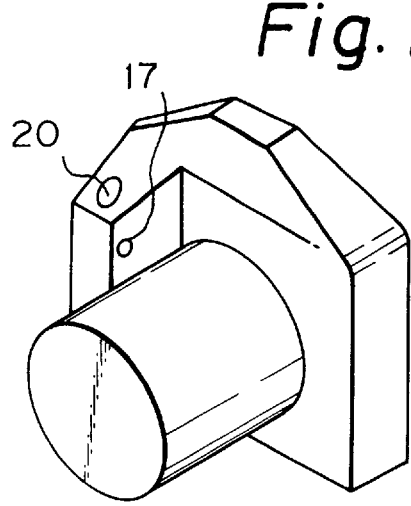
FIG. 2 is a pictorial perspective view of the same image stabilizing camera.

FIG. 1, constituting FIGS. 1A and 1B, shows the circuit of a camera according to a first embodiment of the present invention, and FIG. 2 shows the appearance of the camera.

In FIG. 1, the reference character 3A designates a vibration detection sensor in a horizontal direction, and the reference character 3B denotes a vibration detection sensor in a vertical direction. These sensors include the accelerometers $3a_1$, $3b_1$ and the differential amplifier 5 described with reference to FIG. 11. The reference characters 6A and 6B designate conventional integrators corresponding to the analog integrator described with reference to FIG. 11. The reference character $7_2$A denotes a correction optical system driver in a horizontal direction, the reference character $7_2$B designates a correction optical system driver in a vertical direction, the reference characters 8A and 8B denote reference voltage generators, the reference characters 9A, 9B, 10A and 10B designate analog switches, the reference characters 11A and 11B denote indicator drivers, the reference characters 12A and 12B designate indicator elements, the reference numeral 13 denotes a finder, the reference characters 14A and 14B designate OR circuits, the reference numeral 15 denotes a decoder, the reference numerals $15_1$, $15_2$, $15_3$ and $15_4$ designate output terminals, the reference numeral 16 denotes a counter, the reference numeral 17 designates a switch, and the reference numeral 18 denotes a driving signal source.

That is, the correction optical system driver $7_2$A in the horizontal direction and the correction optical system driver $7_2$B in the vertical direction receive as inputs the hand vibration integration outputs from the integrators 6A and 6B or the reference voltages from the reference voltage generators 8A and 8B by the change-over of the switches 9A and 9B, and drive the correction optical system.

The analog switches 9A and 9B are designed to connect the integrators 6A and 6B to the drivers $7_2$A and $7_2$B when the outputs from the OR circuits 14A and 14B are input, and to be connected to the reference voltage generators 8A and 8B when said outputs are not input. The OR circuits 14A and 14B are also connected to the analog switches 10A and 10B, respectively, and the analog switches 10A and 10B are connected to the indicator drivers 11A and 11B for driving the indicator elements 12A and 12B comprised of liquid crystal or LED in the finder 13. For example, when the output of the OR circuit 14A is input to the analog switch 10A, the analog switch 10A cuts off the connection between the indicator driver 11A and the driving signal source 18 and turns off the indicator element 12A, and when the output of the OR circuit 14A is not input to the analog switch 10A, the analog switch 10A connects the indicator driver 11A to the driving signal source 18 and turns on or turns on and off the indicator element 12A. The OR circuit 14B, the analog switch 10B, the indicator driver 11B and the indicator element 12B are of a similar construction.

On the other hand, the OR circuits 14A and 14B are connected to the extraneously operable conventional rebound type ON-OFF switch 17 mounted on the camera body, as seen in FIG. 2, through the conventional decoder 15 and counter 16. The counter 16 is designed to pick up the ON-OFF pulse of the switch 17 and repeat the outputting from the output terminals $15_1$, $15_2$, $15_3$ and $15_4$ of the decoder 15 in the named order.

In the image stabilizing camera having the circuit shown in FIG. 1, the camera operator aims at an object or aims at a location in which an object is expected to appear, in the state of photographic panning with the object. Then, the camera operator makes preparations for releasing with his index finger placed on a release button on the camera body grip seen in FIG. 2 and sequentially depresses the switch 17 with his middle finger. Thereby, the indicator elements 12A and 12B in the finder 13 repeat turn-off of both, turn-off of one and turn-on of both. The direction of turn-on of these indicator elements 12A and 12B is the direction in which photographic panning with the object is effected, and during the turn-off of both, the image stabilizing function is caused to act on both of the vertical and horizontal axes and panning photography is impossible, and during the turn-on of both, the image stabilizing function is caused to act on neither of the vertical and horizontal axes. Accordingly, the camera operator completes his work simply by depressing the switch 17 so that the indicator elements 12A and 12B are turned on in the direction in which the camera operator wants to effect panning.

For example, when the camera operator depresses the switch 17 three times, the output terminal $15_3$ of the decoder 15 outputs and the output terminals $15_1$, $15_2$ and $15_4$ of the decoder 15 do not output. Therefore, the OR circuit 14B outputs, but the OR circuit 14A does not output and the correction optical system driver $7_2$B in the vertical direction is connected to the integrator 6B and image stabilization in the vertical direction is started, while the correction optical system driver $7_2$A in the horizontal direction is connected to the reference voltage generator 8A and the optical system in the the horizontal direction is fixed in a stopped condition. Here, connecting the correction optical system driver $7_2$A in the horizontal direction to the reference voltage generator 8A is for enabling the correction optical system driver $7_2$A in the horizontal direction to hold the correction optical system substantially at the central position in the driving range against the biasing force of a spring by imparting a predetermined voltage from the reference voltage generator 8A to the correction optical system driver $7_2$A in the horizontal direction because the correction optical system for image stabilization is urged to one side limit position in the driving range by said spring. Thereby, when panning photography with the camera moved in the horizontal direction is effected, the correction optical system is not image-stabilized in that direction and remains held substantially at the central position in the the horizontal driving range and thus, image stabilization acts only in vertical direction and, threfore, the inconvenience that the correction optical system is moved in the direction of panning photography by the image stabilizing action and proper panning photography cannot be accomplished and in the directions other than that the direction of panning, image stabilization acts to prevent image vibration during panning photography.

Also, at this time, the indicator drive 11B has its connection to the driving signal source 18 cut off by the output of the OR circuit 14B and the indicator element 12B is turned off, but since the OR circuit 14A does not output, the indicator element 12A is turned on and this indicates the direction of the correction optical system in which it is stopped, i.e., the direction in which panning is effected.

Figure 3:
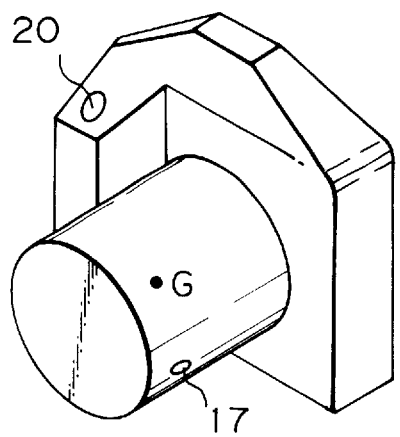
FIG. 3 is a pictorial perspective view of an image stabilizing camera according to a second embodiment of the present invention.

FIG. 3 shows a second embodiment of the present invention in which the switch 17 is mounted on the lens side, i e., near the center of gravity G of the lens. In the case of this second embodiment, the switch operation is performed, for example, by the thumb of the hand supporting the lens. In the case of a lens of great weight, frequent switch operation of the camera body portion induces great disturbance and vibration which cannot be suppressed even by the image stabilizing function, however, such disturbance can be prevented by providing the switch 17 near the center of gravity G if inertia is great as in a lens of great weight, and, moreover, malfunctioning is not liable to occur because the hand depressing the release button 20 is different from the hand depressing the switch 17.

Figure 4:
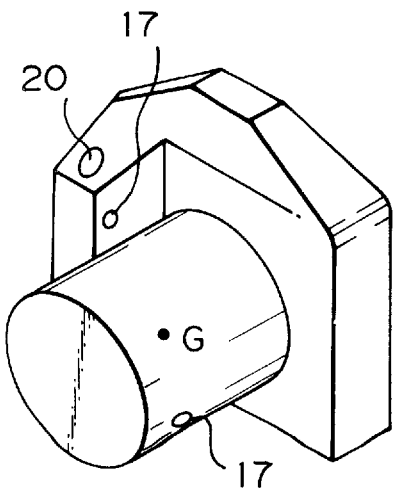
FIG. 4 is a pictorial perspective view of an image stabilizing camera according to a third embodiment of the present invention.

FIG. 4 shows a third embodiment of the present invention in which switches 17 are provided at two locations on the camera body side and near the center of gravity G. If this arrangement is employed, the camera operator can choose a more convenient switch, thereby speeding up the preparation for photography.

Figure 5A:
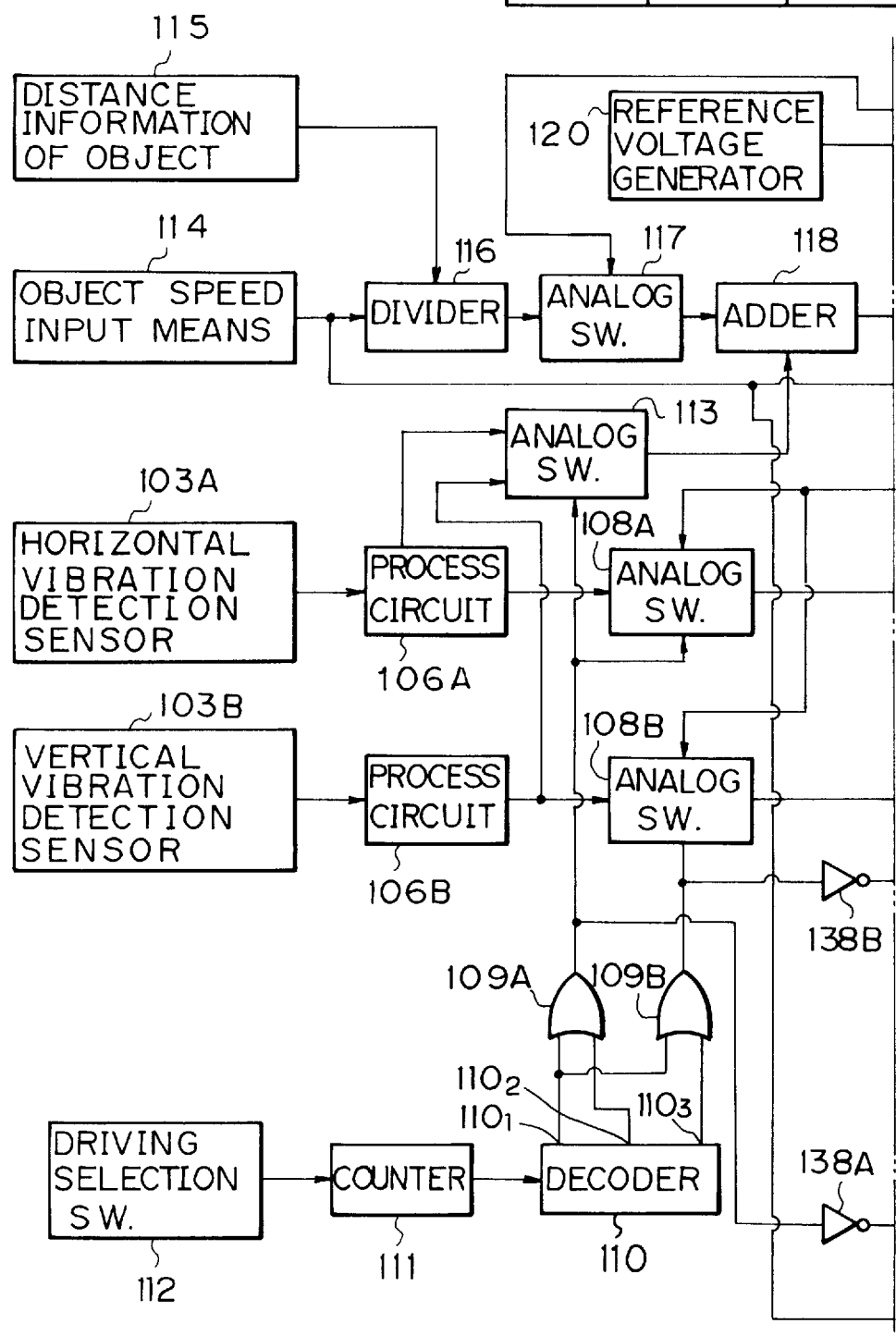
Figure 5:
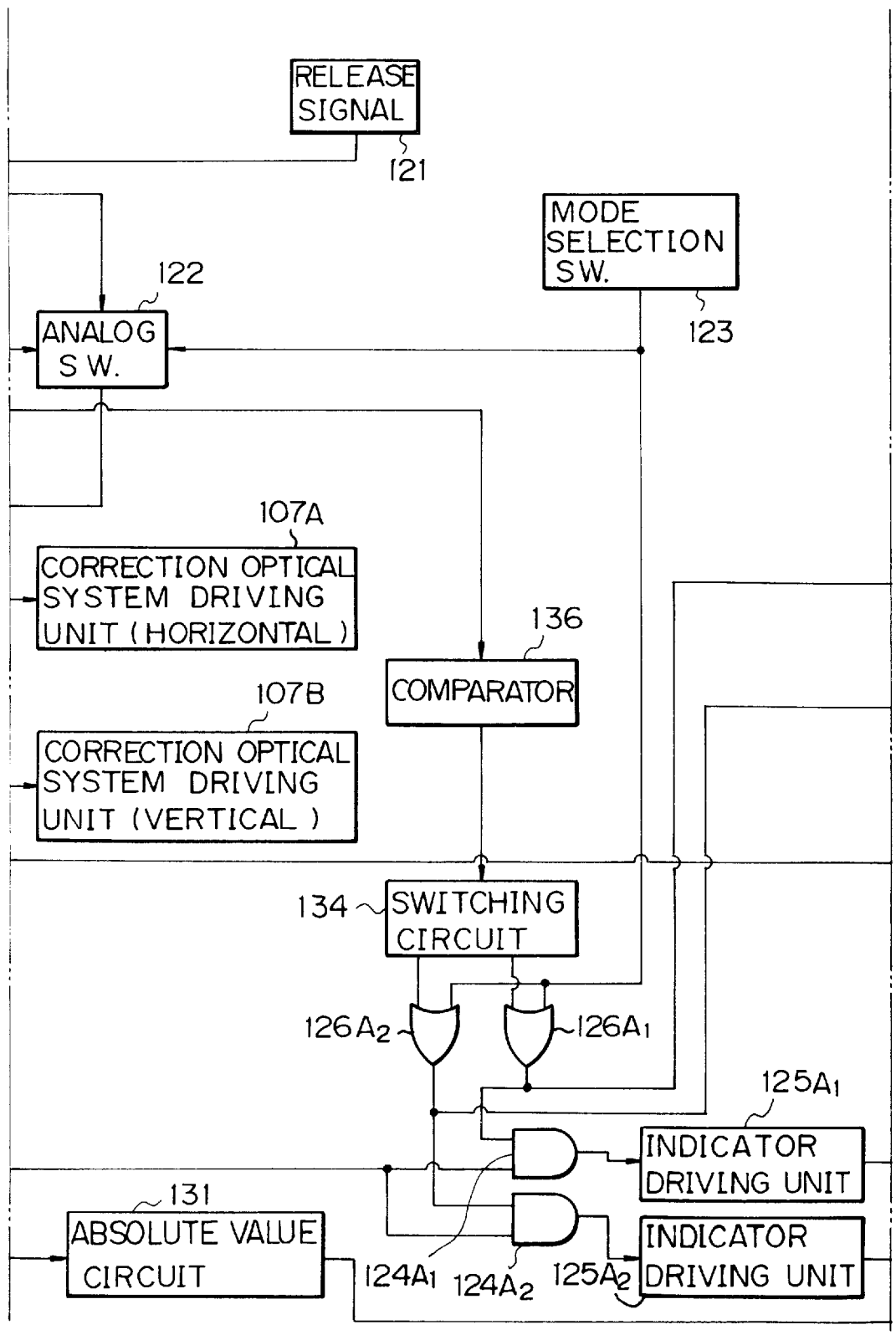
Figure 5C:
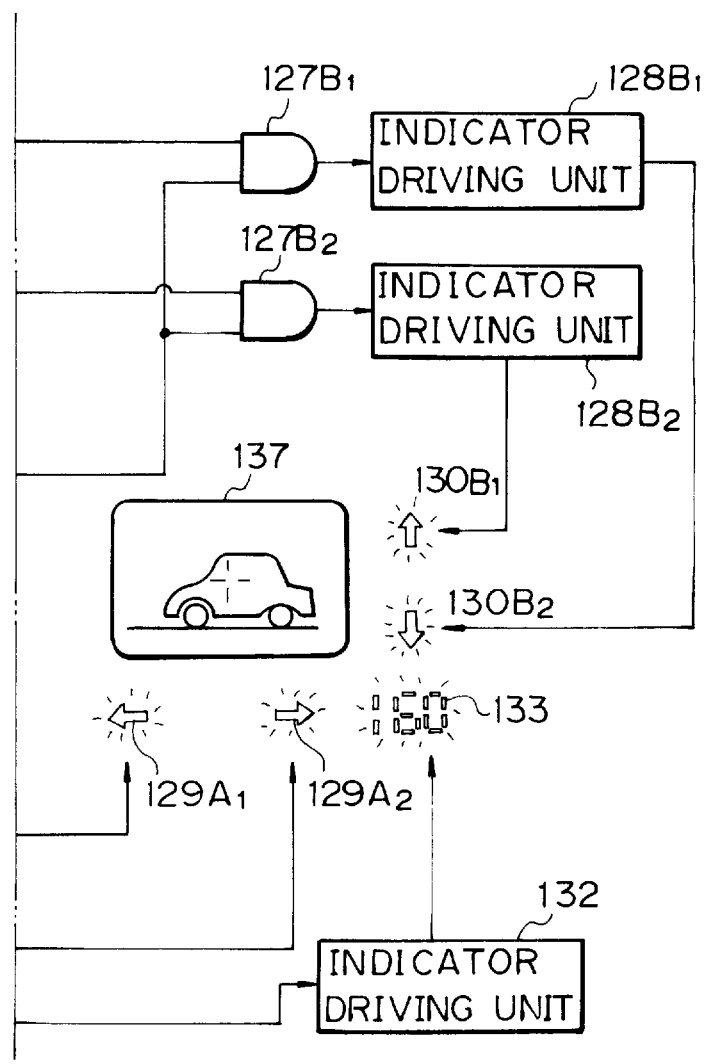

FIG. 5 shows a fourth embodiment of the present invention.

Figure 11:
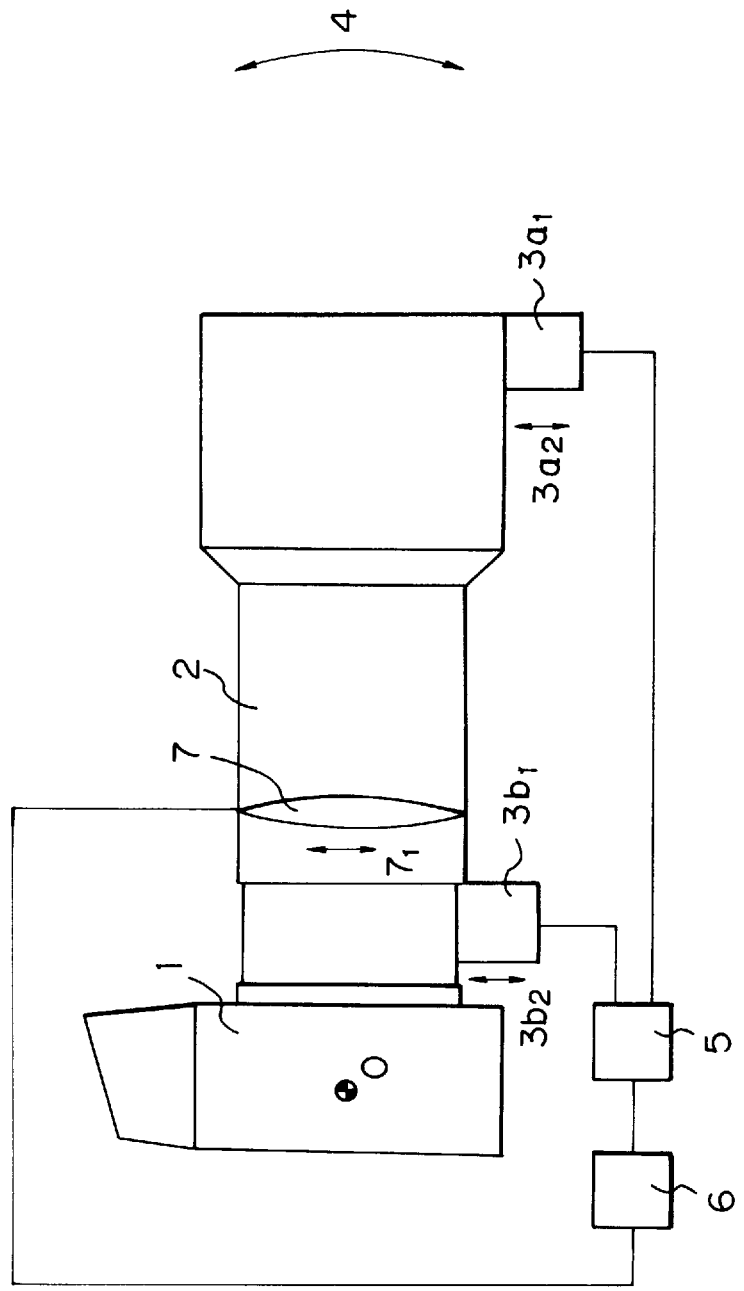
FIG. 11 illustrates an example of the prior art.

In FIG. 5, the reference character 103A designates a horizontal camera vibration detection sensor and the character 103B denotes a vertical camera vibration detection sensor, and these include the acceleration sensors $3a$, $3b$ and differential amplifier 5 in FIG. 11. The reference characters 106A and 106B designate conventional process circuits corresponding to the integrator 6 of FIG. 11, and these process circuits output a camera vibration speed. The reference characters 107A and 107B denote correction optical system drivers in the horizontal direction and the vertical direction, respectively, and these are comprised of a conventional speed control system which effects driving conforming to camera vibration displacement by the camera vibration speed output. By the change-over of analog switches 108A and 108B, the signal of an analog switch 122 is input as the hand vibration integration output from the process circuits 106A and 106B or as the process signal from speed input means 114 which will be described later, whereby the correction optical system is driven. The analog switches 108A and 108B are designed to connect the process circuits 106A, 106B and the correction optical system drivers 107A and 107B in the horizontal and vertical directions when the outputs from the OR circuits 109A and 109B are input, and to be connected to the analog switch 122 when said outputs are not input. The OR circuits 109A and 109B are also connected to AND circuits $124A_1$, $124A_2$ and $127B_1$, $127B_2$ through inverters 138A and 138B, respectively, and the outputs of the AND circuits $124A_1$, $124A_2$, $127B_1$ and $127B_2$ are connected to indicator drivers $125A_1$, $125A_2$, $128B_1$ and $128B_2$, respectively, for driving indicator elements $129A_1$, $129A_2$, $130B_1$ and $130B_2$ each comprised of liquid crystal or LED in the finder 137. When, for example, the OR circuit 109A does not output, a signal is input to the AND circuits $124A_1$ and $124A_2$ because these AND circuits are connected to the OR circuit 109A through the inverter circuit 138A. When, the OR circuit $126A_1$ outputs, the AND circuit $124A_1$ outputs and turns on or turns on and off the indicator element $129A_1$ through the indicator driver $125A_1$.

On the other hand, the OR circuits 109A and 109B are connected through a conventional decoder 110 and a conventional counter 111 to a driving selection switch 112 which is an extraneously operable conventional rebound type ON-OFF switch mounted on the camera body or the like. The counter 111 is designed to pick up the ON-OFF pulse of the switch 112 and repeat outputting of the output terminals $110_1$, $110_2$ and $110_3$ of the decoder 110 in the named order.

The speed signal from object speed input means 114 having an input switch operable from the outside of the camera, not shown, is changed into an absolute value by an absolute value circuit 131, and is indicated 133 in the finder 137 by an indicator driving unit 132. On the other hand, the speed signal from the object speed input means 114 is input to a comparator 136. The output of the comparator 136 has its polarity changed by the polarity of the speed signal and is input to a switching circuit 134. The switching circuit 134 discriminates the polarity of the output and outputs it to the OR circuit 126$A_1$, or to the OR circuit 126$A_2$.

Therefore, when for example, the polarity of the speed output of the object speed input means 114 is positive, the OR circuit 126$A_1$, outputs a signal and inputs it to the AND circuits 124$A_1$ and 127$B_1$, and when the polarity of the speed output is negative, the OR circuit 126$A_2$ outputs a signal and inputs it to the AND circuits 124$A_2$ and 127$B_2$.

Also, when there is an output from a mode selection switch 123, both of the OR circuits 126$A_1$ and 126$A_2$ output and, therefore, if the OR circuit 109A does not output, both of the indicator elements 129$A_1$ and 129$A_2$ are turned on or turned on and off. The indication in the vertical direction in the finder 137 of FIG. 5 is of a similar construction.

The speed signal output from the object speed input means 114 has its ratio to object distance information 115 found by a divider circuit 116, and is connected to an adder circuit 118 by an analog switch 117 when a release signal 121 is output. The adder circuit 118 receives as inputs the signals from the process circuits 106A and 106B through an analog switch 113. The analog switch 113 is designed to connect the adder circuit 118 to the process circuit 106B by the output of the OR circuit 109A, and to connect the adder circuit 118 to the process circuit 106A when there is no output of the OR circuit 109A.

The ratio of the speed signal from the object speed input means 114 to the object distance information 115 is added to the output of the process circuit 106A or 106B by the adder circuit 118 when a release signal 121 is output.

The analog switch 122 causes the output of the reference voltage generator 120 to be input to the analog switches 108A and 108B when the mode selection switch 123 outputs, and causes the signal of the adder circuit 118 to be input to the analog switches 108A and 108B when the mode selection switch 123 does not output.

In the image stabilizing camera with the function enabling panning photography having the circuit constructed as shown in FIG. 5, for example, the photographer panning a camera with a racing car he sequentially depresses the driving selection switch 112 to aim at the point at which panning photography is effected and selects the axis on which he wants to effect panning. Thereby, the output terminals 110$_1$, 110$_2$ and 110$_3$ of the decoder 110 output in succession and turn on or turn on and off the indicator elements 129$A_1$, 129$A_2$, 130$B_1$ and 130$B_2$ of the finder 137 through NAND gates 138A, 138B, AND gates 124$A_1$, 124$A_2$, 127$B_1$, 127$B_2$ and indicator driving units 125$A_1$, 125$A_2$, 128$B_1$, 128$B_2$. When the decoder output terminal 110$_1$ is outputting, the outputs of both of the OR circuits 109A and 109B are input to the analog switches 108A and 108B and the outputs of the process circuits 106A and 106B are directly input to the correction optical system drivers 107A and 107B in the horizontal and vertical directions through the analog switches 108A and 108B and therefore, image stabilization is effected, but panning is not effected and none of the indicator elements 129$A_1$, 129$A_2$, 130$B_1$ and 130$B_2$ are turned on.

That is, the photographer selects the horizontal axis indicated by the indicator elements 129$A_1$ and 129$A_2$ or the vertical axis indicated by the indicator elements 130$B_1$ and 130$B_2$, by means of the driving selection switch 112, as the direction in which panning is effected while confirming the indication in the finder. Then the photographer depresses the mode selection switch 123 to effect the change-over between automatic panning and manual panning (so-called conventional panning photography). During manual panning the indicator elements 129$A_1$ and 129$A_2$ or 130$B_1$ and 130$B_2$ in the finder are turned on or turned on and off at a predetermined time.

Next, in the case of automatic panning, the photographer operates a speed input switch, not shown, comprised of a rebound switch, a counter, etc. to thereby input a desired speed signal for panning to the object speed input means 114. For example, if the speed of a racing car to be photographed is 160 km/h, the photographer operates the speed input switch in accordance therewith and confirms the indication 133 through the absolute value circuit 131 and the indicator driving unit 132 in the finder. Although the speed input switch is not shown because it is conventional, it is capable of changing over the polarity of speed, and the polarity of the signal of the object speed input means 114 is discriminated by the comparator 136 and one of the OR circuits 126$A_1$ and 126$A_2$ is caused to output by the switching circuit 134, and one of the indicator elements 129$A_1$ and 129$A_2$ or one of the indicator elements 130$B_1$ and 130$B_2$ is turned on or turned on and off through the AND circuits 124$A_1$ and 127$B_1$ or the AND circuits 124$B_2$ and 127$B_2$ to thereby select the direction of panning.

That is, by the change-over of the polarity by the speed input switch, the direction of panning is reversed, and this can be confirmed through the finder 137. The mode selection switch 123 is operated when panning is manually effected, and when this switch 123 outputs, the signal of the reference voltage generator 120 is input to the correction optical system driver 107A or 107B through the analog switch 122. Also, the output of this switch causes both of the OR circuits 126$A_1$ and 126$A_2$ to output, and the indication of both of the axes on which desired manual panning is effected is done from the OR circuits 109A and 109B, for example, the indicator elements 129$A_1$ and 129$A_2$ are turned on or turned on and off. Note that, since the function of the reference voltage generator is the same as the reference voltage generator 8A in FIG. 1. a detailed explanation thereof will be omitted.

For example, let it be assumed that the photographer effects automatic panning from the right to left in the horizontal direction. The photographer operates the driving selection switch 112 and the speed input switch 114 and the change-over of the polarity thereof to thereby turn on or turn on and off the indicator element 129$A_1$ in the finder and set a desired speed in the indicator 133. At this time, the OR circuit 109A does not output, but the OR circuit 109B outputs. Therefore, the analog switch 108B causes the signal of the vertical vibration detection sensor 103B to be input to the correction optical system driver 107B through the process circuit 106B, and the analog switch 113 causes the signal of the the horizontal vibration detection sensor 103A to be input to the adder circuit 118 through the process circuit 106A. On the other hand, this is automatic panning and therefore, the mode selection switch 123 is not operated and, outputting is not effected. Thus, the analog switch 122 causes the signal of the horizontal vibration detection sensor 103A to be input from the adder circuit 118 to the analog switch 108A, and since the OR circuit 109A is not outputting, the analog switch 108A causes the signal from the analog switch 122 to be input to the correction optical system driver 107A. Accordingly both of the vertical and horizontal axes are in the image-stabilized condition.

When the racing car appears in the finder 137 and the photographer outputs a release signal 121, a signal representative of the ratio of the set speed signal of the object speed input means 114 to the object distance information 115 is output from the divider circuit 116, and is added to the signal of the process circuit 106A by the adder circuit 118 through the analog switch 117, and by this signal, the correction optical system driver 107A drives the correction optical system from the right to left in the horizontal direction which is the direction of panning while image-stabilizing the correction optical system.

Here, for example, if the object distance l is 200 m and the set speed v is 160 km/h and the focal length f of the lens is 300 mm, the driving speed $v_c$ of the correction optical system by the correction optical system driver 107A is as follows:

$$v_c = \frac{v \times \frac{1000}{60^2}}{l} \times 300 = 66.7 \text{ (mm/s)}$$

Also, if the shutter speed is 1/60(S), the amount of movement of the correction optical system is 1.11 (mm).

Thereby, the correction optical system tracks the racing car correspondingly to the speed set in the speed input means 114 and the vibration of disturbance is eliminated by the vertical and the horizontal image stabilizing actions and therefore, splendid panning photography in which the object is clear with the background blurred becomes possible to anybody. Panning in the other direction is similar and therefore need not be described. Manual panning is similar to that in the first embodiment and therefore need neither be described.

Figure 6B:
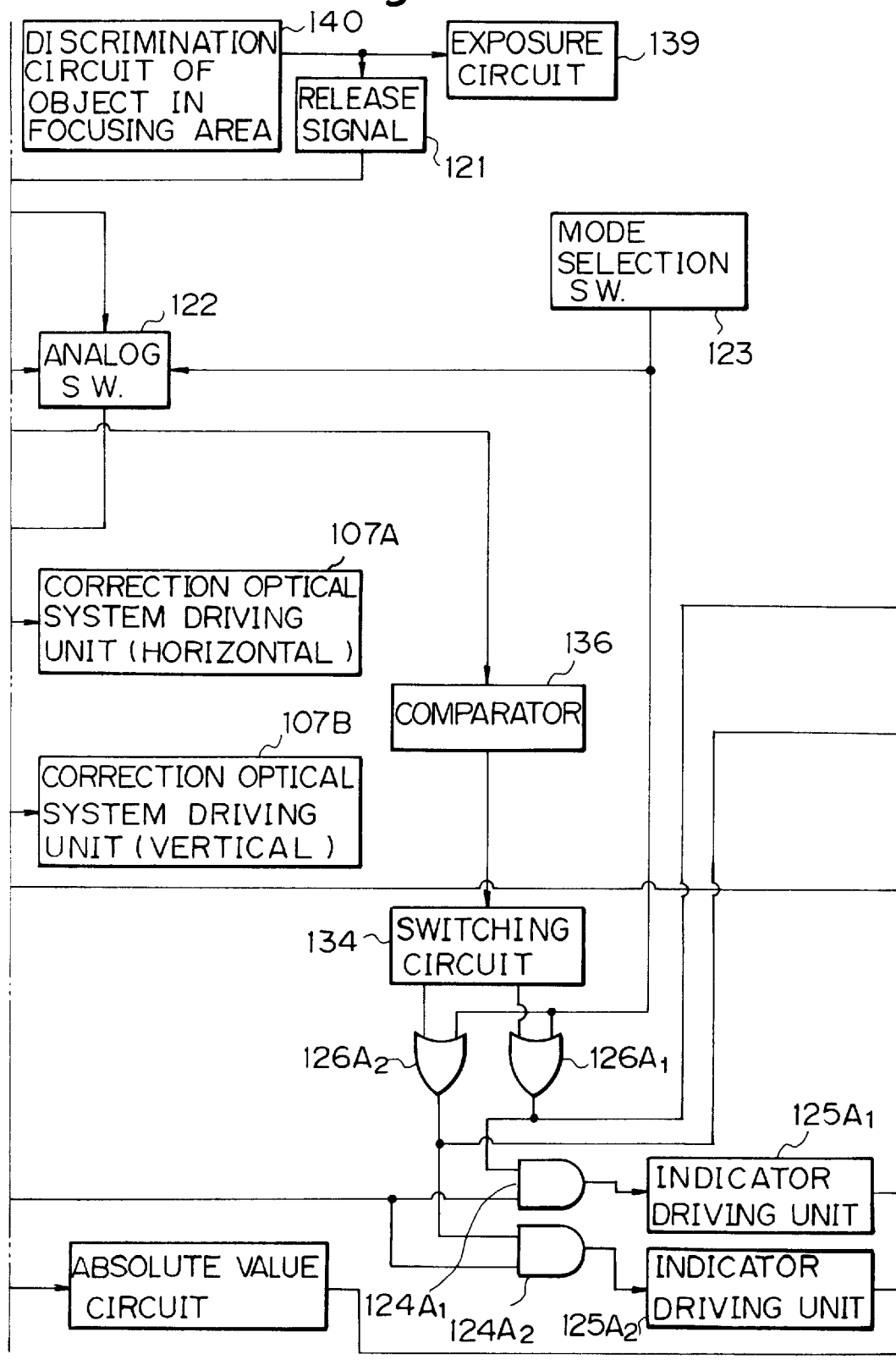
Figure 6C:
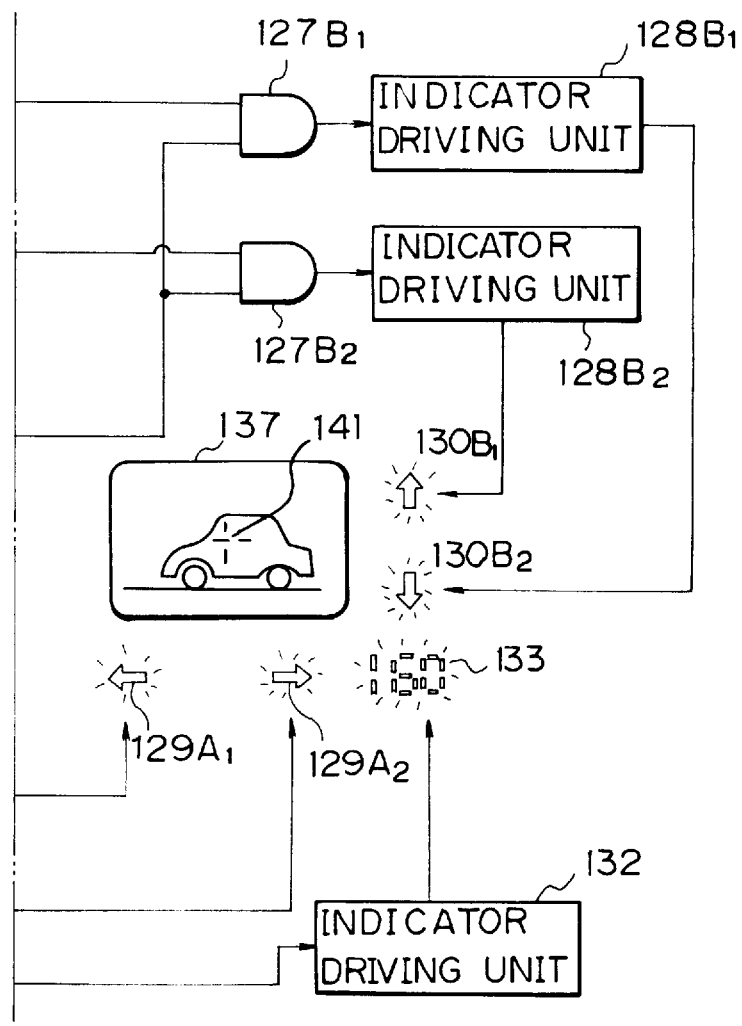

FIG. 6 shows a fifth embodiment of the present invention.

The difference of this fifth embodiment from the embodiment of FIG. 5 is that a discrimination circuit 140 of object in the focusing area is added. Members similar in construction to those in FIG. 5 are given similar reference characters and need not be described (this also holds true of the ensuing embodiments.), This circuit outputs a signal if the object in the finder focusing area 141 is at a preset object distance, and photography is effected in an exposure circuit 139. For this purpose, the object distance is preset in the discrimination circuit 140 of the object in the focusing area, and when the object to be photographed enters the area 141, the exposure operation is started. This is known as a function added to an autofocus camera, and the correction optical system driver 107A or the correction optical system driver 107B can be driven in synchronism with the signal of the discrimination circuit 140.

More particularly, when a signal is output from the discrimination circuit 140 of the object in the focusing area, it is input to the exposure circuit 139 and the exposure operation is started and is also input to the release signal 121, and the analog switch 117 causes a signal representative of the ratio of the speed signal of the speed setting circuit 114 output by the divider circuit 116 to the output of the object distance information 115 to be input to the adder circuit 118, causes said signal to be added to the signal of the process circuit 106A and causes the sum signal to be input to the correction optical system driver 107A or the correction optical system driver 107B through the analog switch 122, the analog switch 108A or the analog switch 108B, thereby driving the correction optical system in the direction of panning.

With this construction, as compared with the aforementioned embodiments in which the photographer himself effects the signal release, the failure by the delay of the release timing can be prevented and panning photography in which the object is always at the center of the frame becomes possible.

Figure 7B:
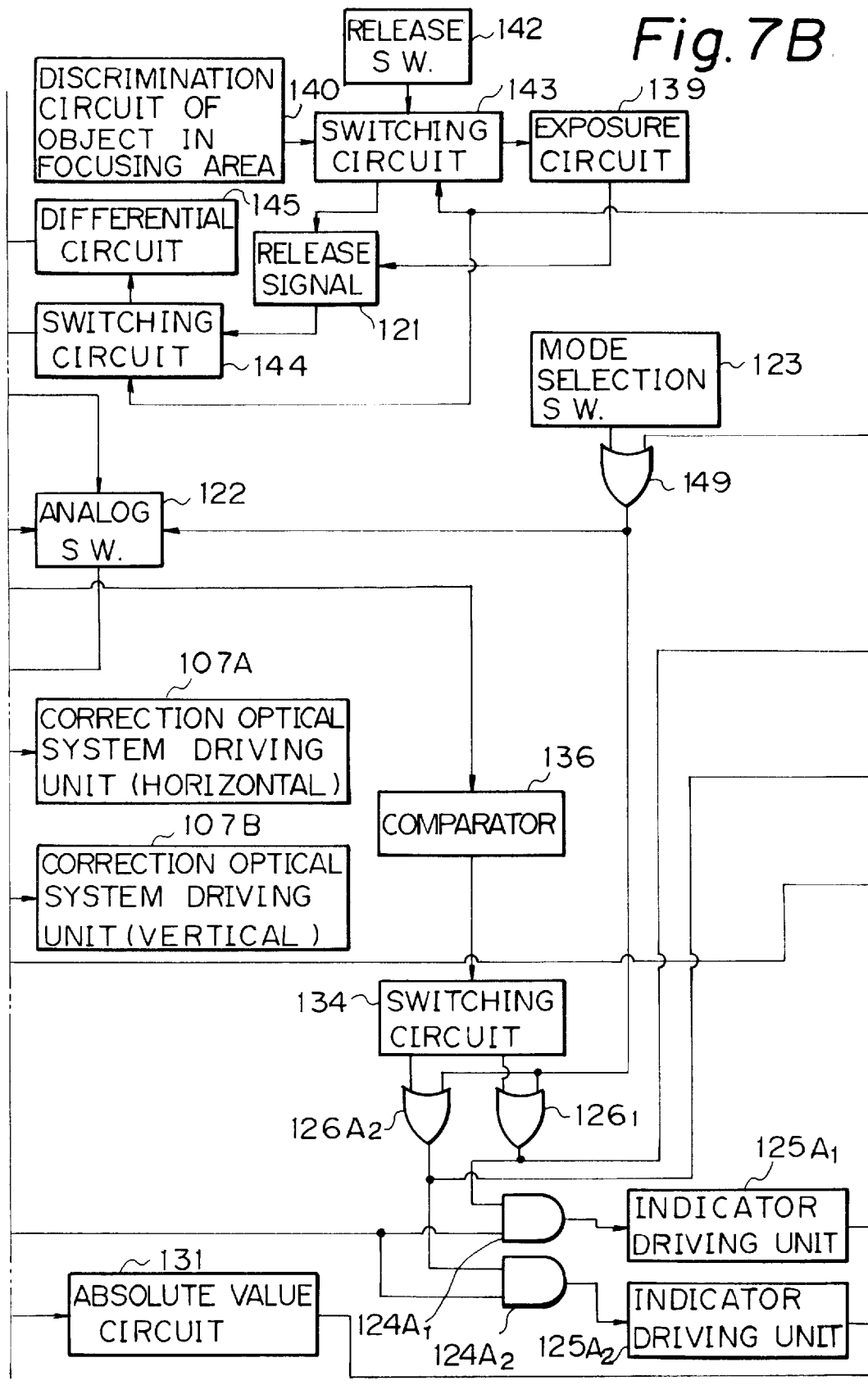
Figure 7C:
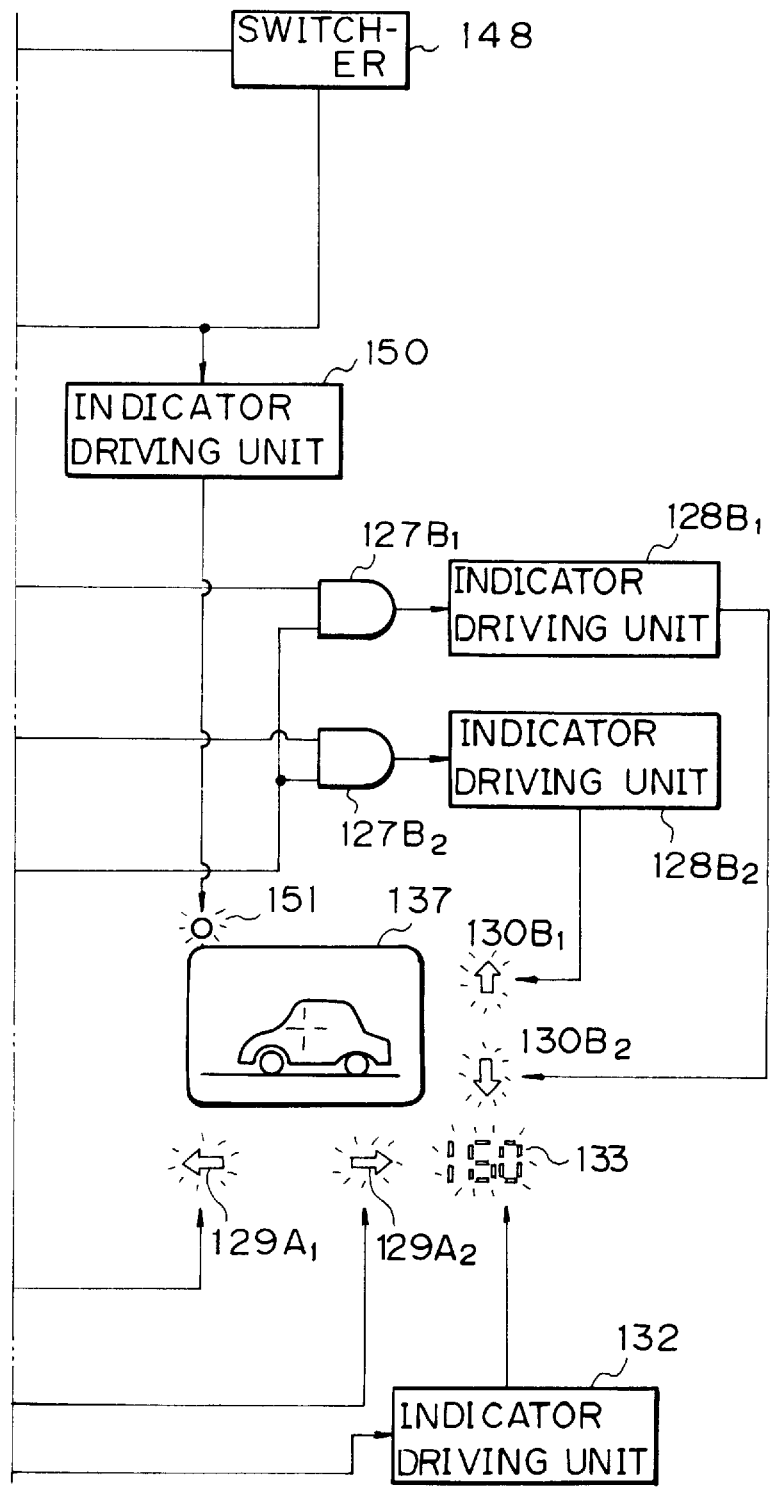

FIG.7 shows a sixth embodiment of the present invention.

This sixth embodiment is simpler and more reliable in operation than the aforementioned fourth and fifth embodiments.

That is, an indicator driving unit 150 is driven by the output of a change-over switch 148 to turn on or turn on and off an input mode indication 151 in the finder 137 and the output of the change-over switch 148 is input to the OR circuits $126A_1$ and $126A_2$ through an OR circuit 149 and therefore, the bidirectional indicator elements $129A_1$ and $129A_2$ or $130B_1$ and $130B_2$ for indicating the axis of the direction of panning selected by the aforementioned driving selection switch 112 are turned on or turned on and off.

The switching circuit 143 connects the output of the release switch 142 directly to the release signal 121 by the output of the change-over switch 148, and connects the output of the release switch 142 to the release signal 121 through the exposure circuit 139 and connects the discrimination circuit 140 of the object in the focusing area to the exposure circuit 139 when there is no output of the change-over switch 148. The switching circuit 144 also connects the release signal 121 to at differential circuit 145 by the output of the change-over circuit 148, and connects the release signal 121 to the analog switch 117 when there is no output of the change-over switch 148.

The differential circuit 145 differentiates the release signal 121 and converts it into a pulse, and supplies the pulse to a sample hold circuit 146. By said pulse, the sample hold circuit 146 samples and holds the outputs of the process circuits 106A and 106B of the sensor for detecting the vibration of the axis of the direction of panning preselected by the driving selection switch 112, and inputs them to camera speed input means 114'. The product of the output of the camera speed input means 114' and the object distance information 115 is output from a multiplier 147, and is indicated 133 as the object speed through the absolute value circuit 131 and the indicator driving unit 132. This is because the signal output from the process circuits 106A and 106B is the angle of displacement of the camera about the photographer and the product of this output and the object distance information 115 is the speed of the object which the camera pursues by panning.

The speed input operation will now be described. When effecting panning for a racing car, the photographer aims at a point at which panning is to be effected, and sequentially depresses the driving selection switch 112 to thereby select the direction of panning while watching the indication of the indicator elements $129A_1$ and $129A_2$ or the indicator elements $130B_1$ and $130B_2$ in the finder 137. The present embodiment up to this stage is the same as the aforedescribed fourth embodiment.

Subsequently, the change-over switch 148 is input and the input mode indication 151 is turned on or turned on and off through the indicator driving unit 150. The change-over switch 148 is a conventional rebound switch, and outputs a signal when the switch is depressed, and does not output a signal when the switch is released. When the change-over switch 148 outputs a signal, that output is further input to the OR circuits $126A_1$ and $126A_2$ through the OR circuit 149, and the indication of both directions of the selected axis on which panning is effected, i.e., the indication of the indicator elements $129A_1$ and $129A_2$ or the indicator elements $130B_1$ and $130B_2$, is turned on or turned on or off.

Subsequently, the photographer supposes that the racing car has appeared at the point at which the camera is aimed while depressing the change-over switch 148 and actually shakes the camera and effects panning, and depresses the release switch 142. At this time, the OR circuit 149 is providing an output signal and therefore, the analog switch 122 connects the reference voltage generator 120 to the analog switches 108A and 108B and inhibits the image stabilizing operation of the axis of the direction in which the panning is effected, thereby making it easy to effect panning speed input. When the change-over switch 148 is providing, if the release switch 142 is depressed, the output thereof is input to the release signal 121 through the analog switch 143, and is further input to the differential circuit 145 through the switching circuit 144. On the other hand, when the change-over switch 148 is providing an output signal the output of the release switch 142 is not input from the switching circuit 143 to the exposure circuit 139 and therefore, photography is not effected.

The output of the release switch 142, made into a pulse by the differential circuit 145 provides a timing signal for the sampling and holding by the sample hold circuit 146. The sample and hold circuit 146 samples and holds the angular speed of the process circuit 106A or the process circuit 106B for the panning axis output to the analog switch 113, and supplies it to the camera speed input means 114'. The output of the camera speed input means 114' is multiplied by the output of the object distance information 115 by the multiplier circuit 147, and the multiplied value is indicated as the speed of the object in the direction of panning through the absolute value circuit 131 and the indicator driving unit 132.

The photographer, when he is not satisfied with the content of that indication 133 (the speed of the object in the direction of panning), performs the same operation by changing the speed at which the camera is shaken in the direction of panning, and can very simply obtain a satisfactory indication 133 by repeating it.

When the change-over switch 148 is then released to cut off the output, the indication of one of the indicator elements 129A$_1$ and 129A$_2$ in the finder 137 or the indication of one of the indicator elements 130B$_1$ and 130B$_2$ in the finder 137 is turned on or turned on and off, whereby the direction of panning determined by the aforedescribed operation is indicated in the same manner as in the aforedescribed fourth embodiment. At this time, the switching circuit 143 connects the discrimination circuit 140 of the object in the focusing area to the exposure circuit 139 and connects the release switch 142 to the exposure circuit 139 to thereby enable photography to be accomplished, and the release signal 121 is also connected to the analog switch 117 by the switching circuit 144, and the correction optical system becomes capable of effecting panning on the axis of the direction of panning.

Here, the photographer waits for the racing car to appear with the camera at a fixed, and when the racing car enters the focusing area, as previously described, the discrimination circuit 140 provides and output and the exposure circuit 139 starts the exposure operation and the release signal 121 closes the analog switch 117 through the switching circuit 143, and the output of the camera vibration speed of the camera speed input means 114' is supplied to the adder circuit 118. This signal drives the correction optical system driver 107A or 107B through the analog switch 122 or the analog switch 108A or 108B, whereby panning is effected at the set speed.

With such a construction, the speed input becomes very simple, and in the aforedescribed fourth embodiment, proper panning photography cannot be accomplished unless the object speed is accurate. However, according to the present embodiment, even if the object speed is unknown, the photographer can try to operate the camera in the same manner as the connectional panning while actually supposing the movement of the object before his eyes, thereby accomplishing the speed input for panning and thus, accomplishing proper panning. Another feature of this sixth embodiment is that the photographer can pursue after the object while depressing the change-over switch 148, whereby the speed of the object can be indicated in the finder 137, and this is useful not only for photographing, but also when it is desired to know the speed of the object.

Figure 8A:
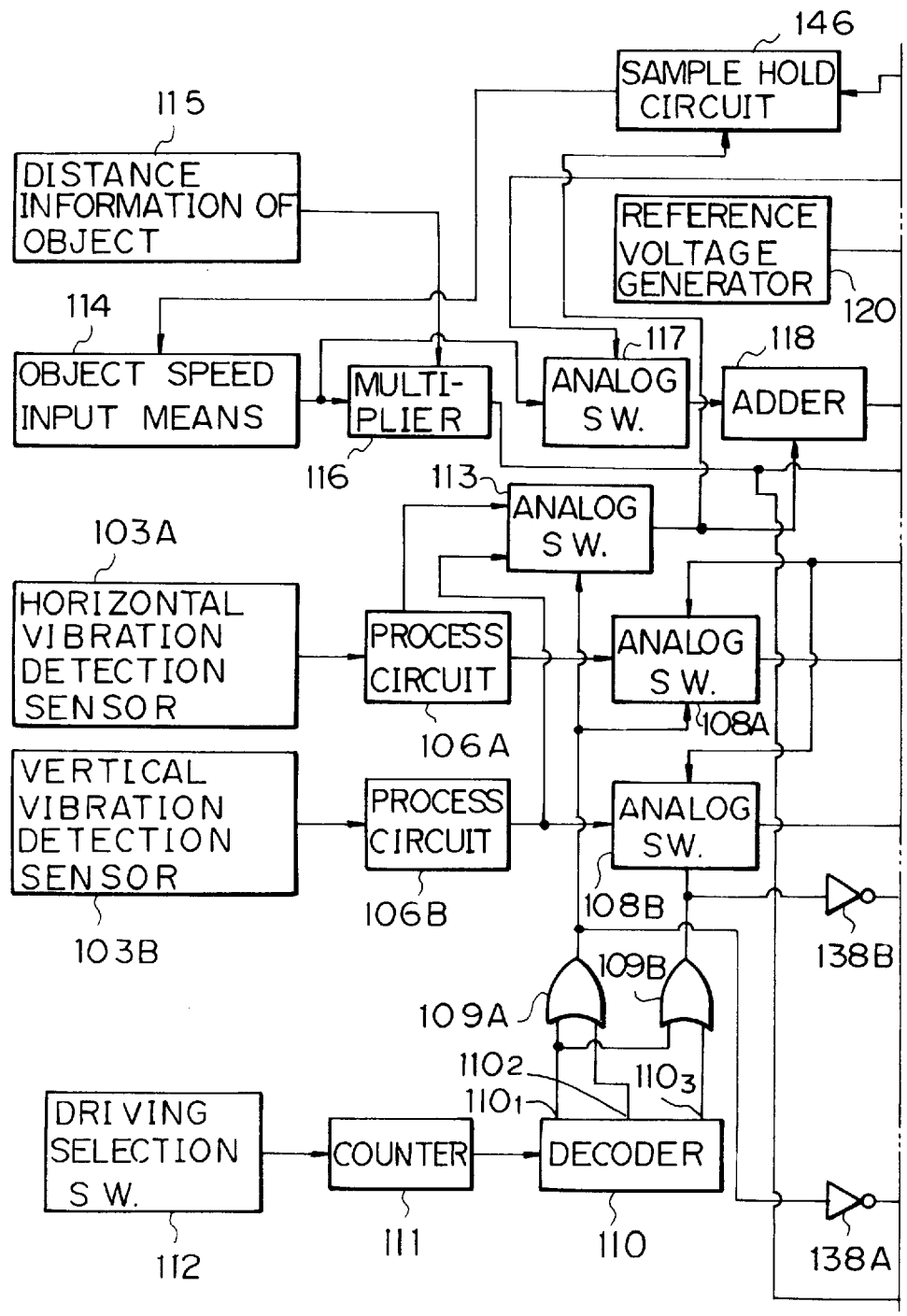
Figure 8B:
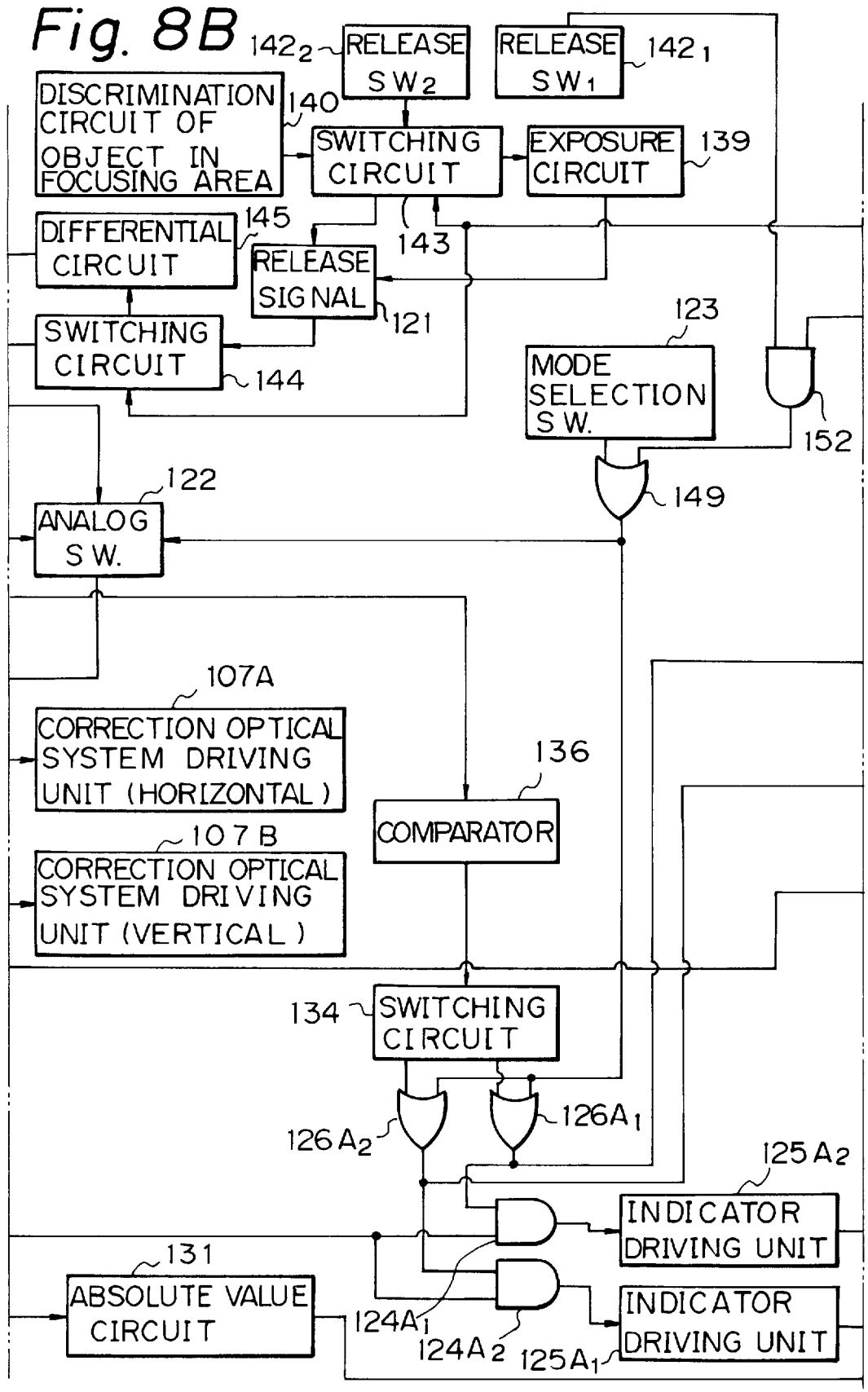
Figure 8C:
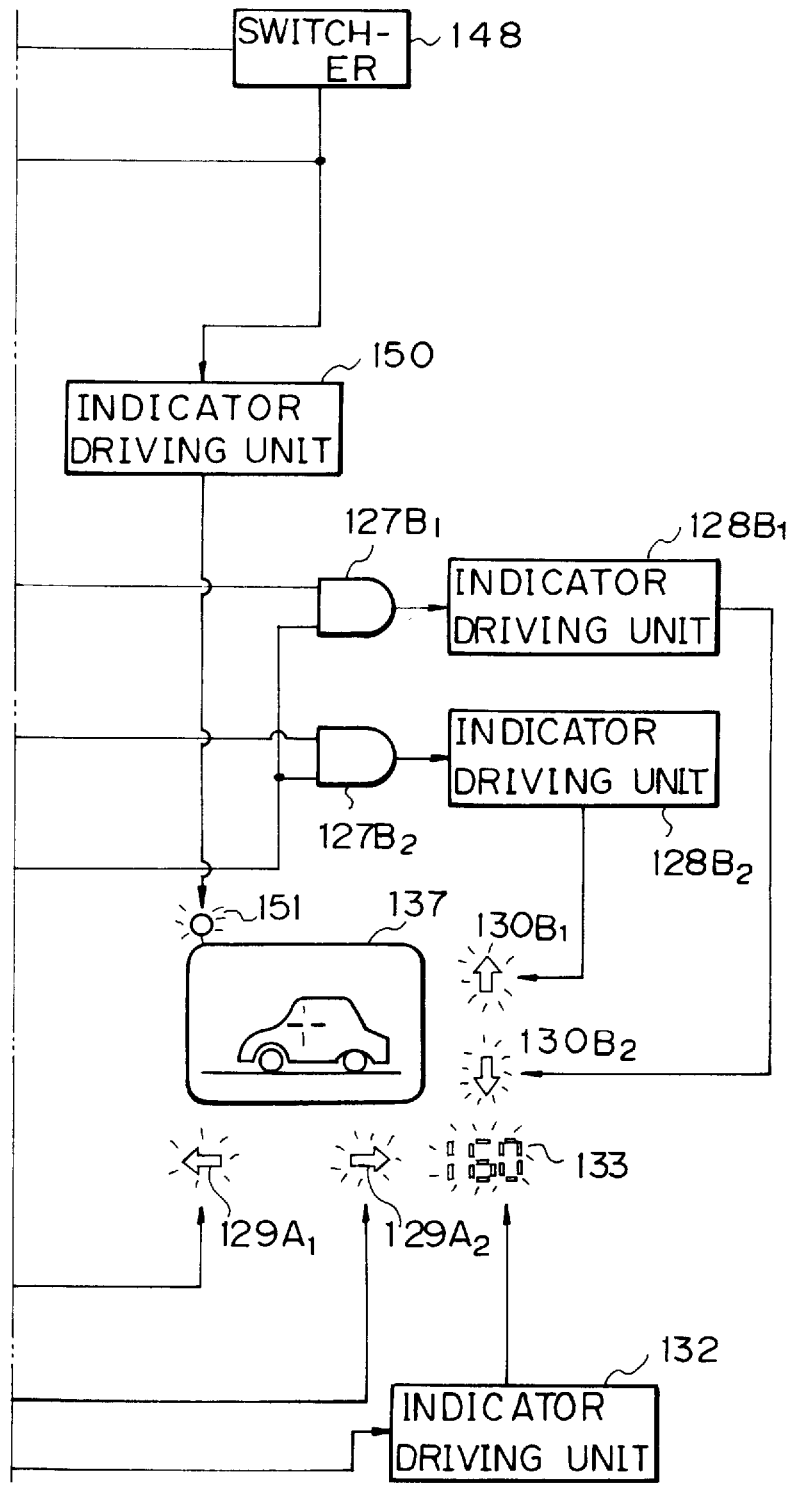

FIG. 8 shows a seventh embodiment of the present invention.

The difference of this seventh embodiment from the sixth embodiment is that by the change-over switch 148 and a release switch 142$_1$ (a half-stroke switch SW$_1$) being depressed at a time, an AND circuit 152 outputs, a signal and the signal is input to the analog switch 122 to connect the reference voltage generator 120 to the analog switch 108A or the analog switch 108B and the correction optical system is stopped without being image-stabilized in the direction of the axis in which panning is effected, thereby making the panning speed input easy to effect. By depressing a release switch 142$_2$ (a full-stroke switch SW$_2$), the speed input: for panning is effected in the same manner as in the sixth embodiment. On the other hand, even if the photographer is depressing the change-over switch 148, he can always see an image on which the image stabilizing effect acts as long as he does not depress the release switches 142$_1$ and 142$_2$ and therefore, the burden borne by the photographer, such as focusing, can be mitigated.

Figure 9A:
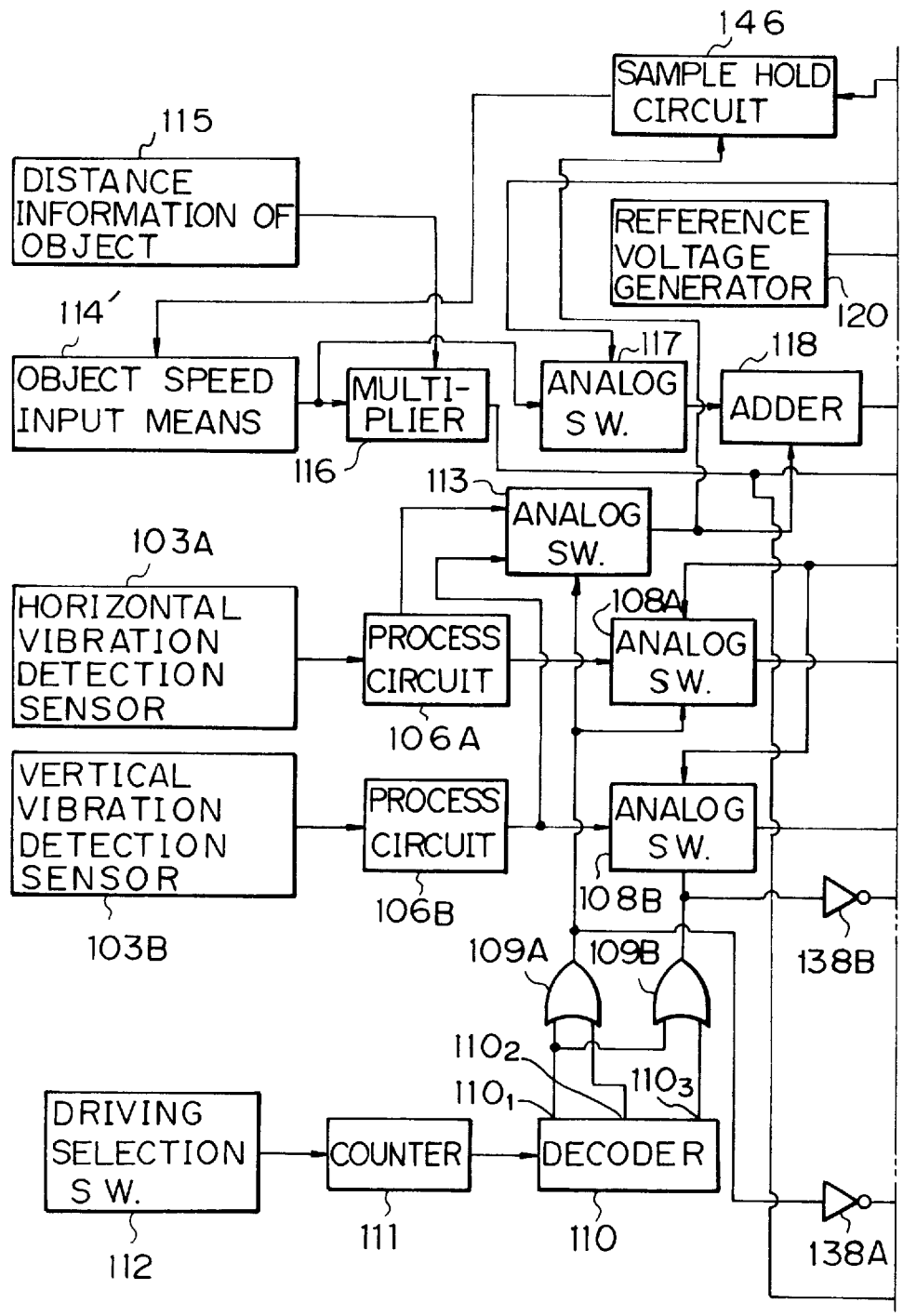
Figure 9C:
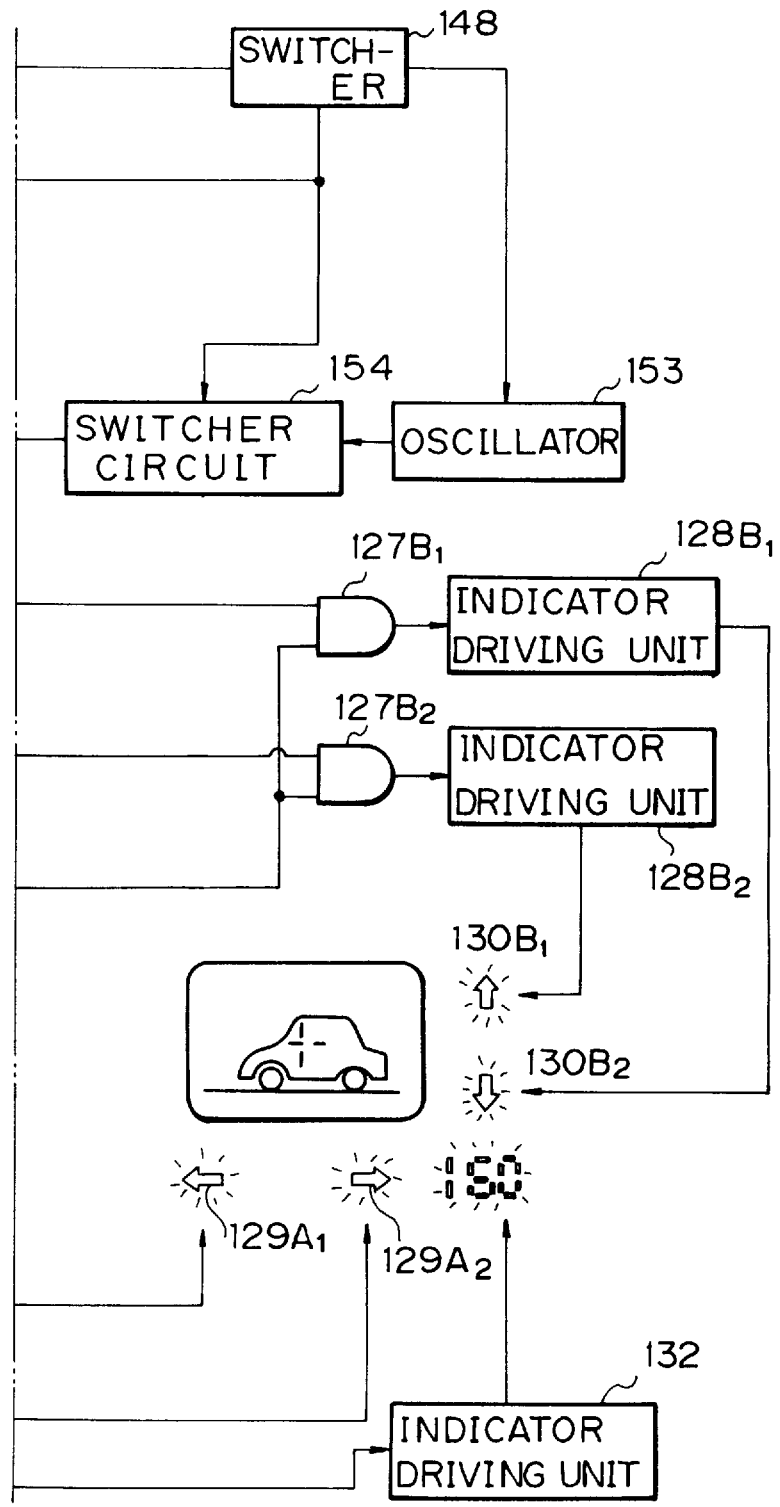

FIG. 9 shows an eighth embodiment of the present invention.

The difference of this eighth embodiment from the seventh embodiment is that the input mode indication 151 and the indicator driving unit 150 of the seventh embodiment are absent and instead, an oscillator 153 and analog switches 154, 155A and 155B are provided.

In this case, when the photographer causes the change-over switch 148 to output the oscillator 153 operates and the switching circuit 154 causes the output of the change-over switch 148 to be intermittent and supplies it to the switching circuits 155*a* and 155B, thereby causing the connection between the OR circuits 109A, 109B and the AND circuits 124A$_1$, 124A$_2$, 127B$_1$, 127B$_2$ to be intermittent. Therefore, the indication of the axis of the direction of panning selected by the input selection switch 112, from example, the indicator elements 129A$_1$ and 129A$_2$, are both turned on and off at a predetermined period by the output of the change-over switch 148, whereby the speed input mode can be confirmed. With such a construction, the number of parts of the indicating and driving units is reduced, and this is not only advantageous in respect of cost and consumed electric power, but also can mitigate the burden of the photographer which results from the reduced number of indications.

Figure 10A:
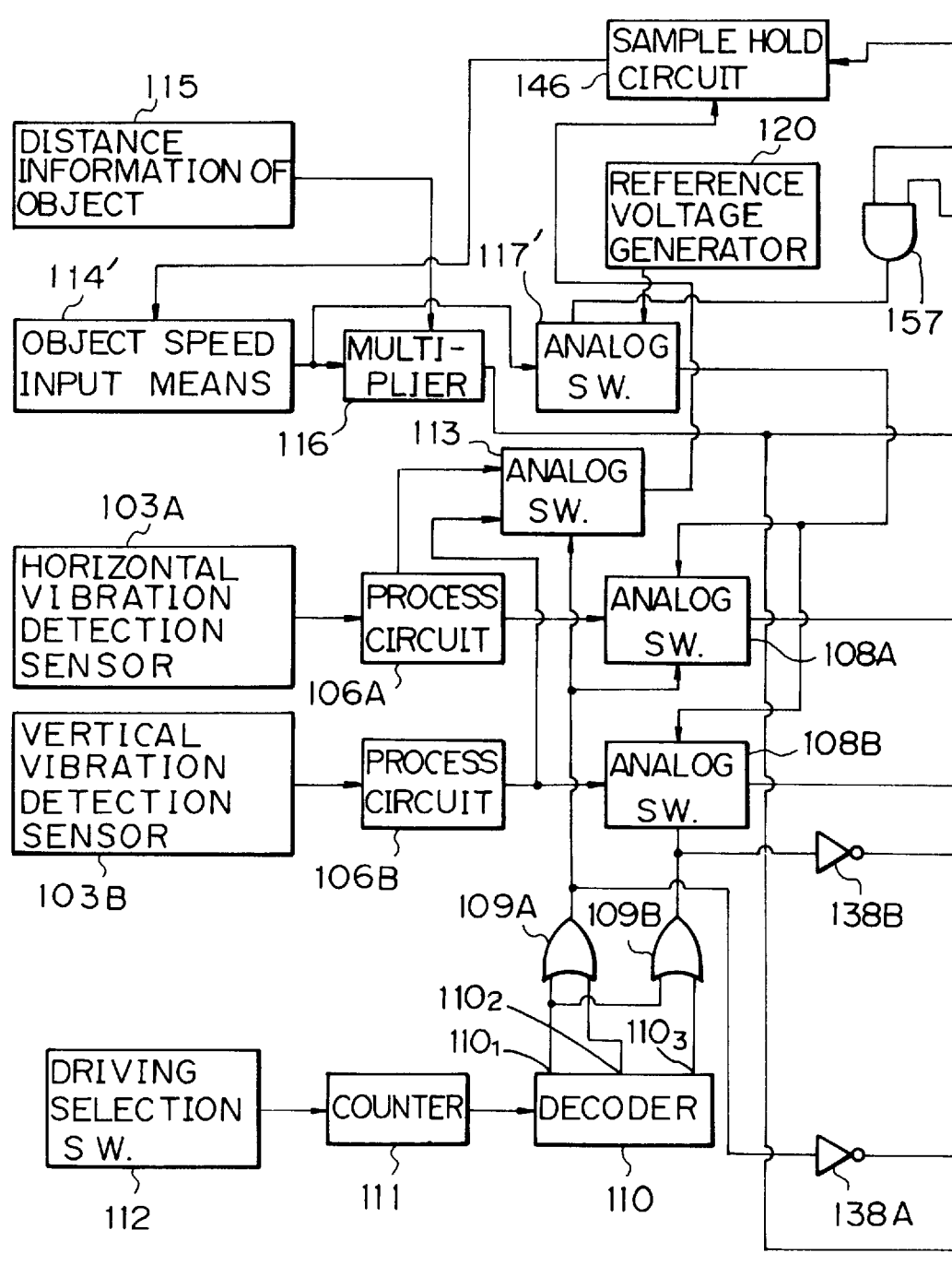
Figure 10B:
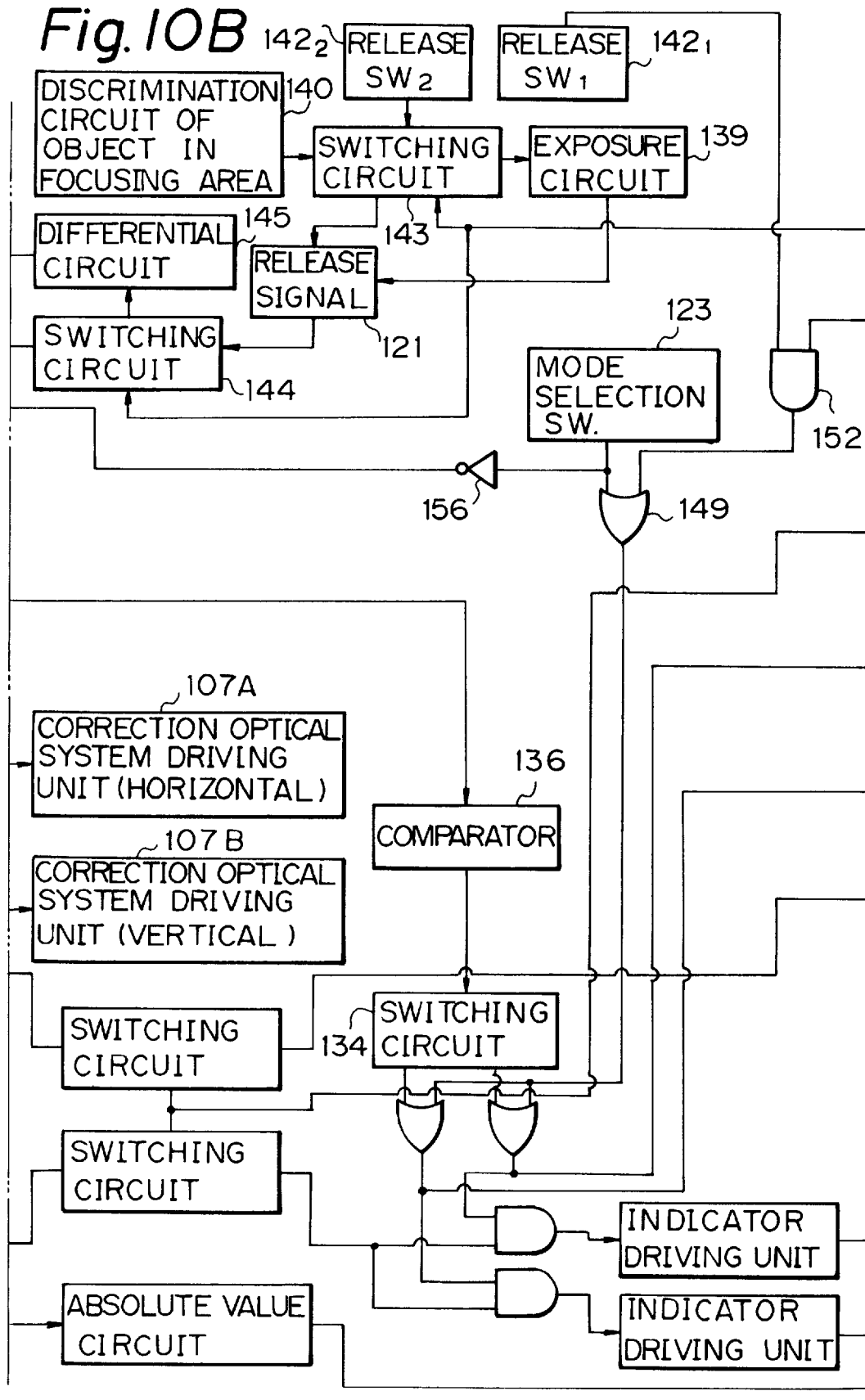
Figure 10:
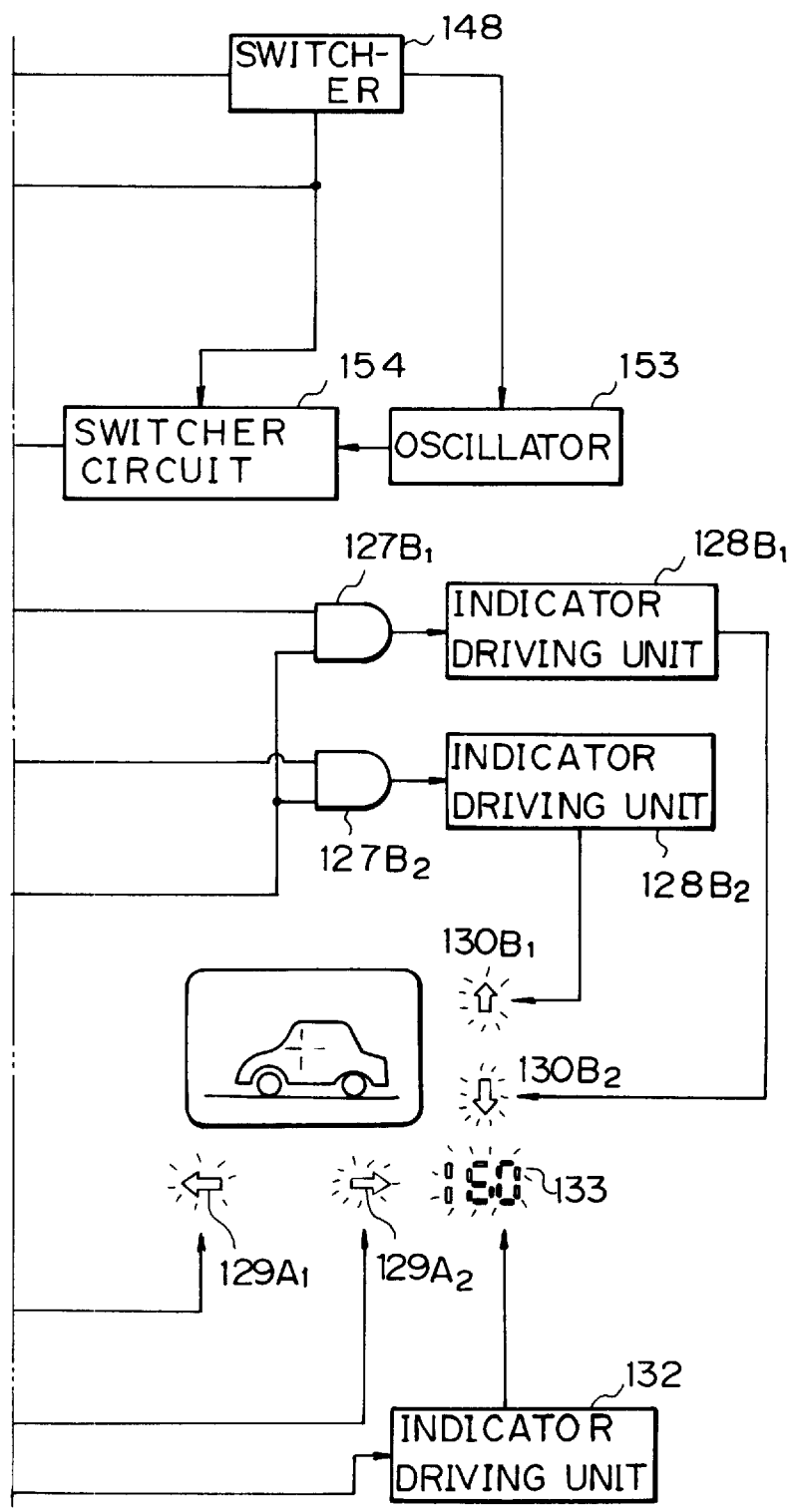

FIG. 10 shows a ninth embodiment of the present invention.

In this ninth embodiment, the adder circuit 118 and the analog switch 122 are eliminated and the output of the analog switch 117 is directly connected to the analog switches 108A and 108B. Also, an inverter 156 and an AND circuit 157 are added.

In the case of this ninth embodiment, the output of the process circuit 106A or 106B is not added to the signal from the camera speed input means 114' for driving the correction optical system at a desired speed and therefore, the image stabilization in the direction of panning is not effected, but in the direction of panning, the correction optical system is moved and therefore, the difference resulting from the presence or absence of image stabilization is not much felt and instead, a great reduction in the number of parts has become possible.

The mode selection switch 123 changes over the automatic panning of the present invention and the manual panning photography but when the mode selection switch 123 is outputting, the indications of the indicator elements $129A_1$ and $129A_2$ or the indicator elements $130B_1$ and $130B_2$ in the direction of the axis on which panning is effected are turned on or turned on and off at a time as in the fourth to eighth embodiments, and on the other hand, no input is effected to the AND circuit 157 by the inverter 156 and therefore, the release signal 121 is not input to the analog switch 117, and even if release is effected, the correction optical system is not driven during manual panning.

Again in this ninth embodiment, the methods of speed input, release and indication as described in the first to seventh embodiments may safely be adopted, and particularly, where the speed input is effected by a switch as in the fifth embodiment, the analog switch 113 and the wiring thereof can be eliminated and thus, the circuit can be more simplified.

The above-described embodiments are all such that the correction optical system are image-stabilized in two directions, but of course, the present invention is equally applicable to a camera in which the correction optical system is image-stabilized in three or more directions and some of them are used for panning photography.

We claim:

1. An image blur prevention apparatus for use with a camera and including a signal output circuit which outputs a signal for starting a photographing operation, said apparatus comprising:

an image blur prevention device which prevents image blur;

a setting portion that selectively sets said image blur prevention device in a first operation mode and a second operation mode, wherein in the first operation mode said image blur prevention device performs image blur prevention, and wherein in the second operation mode said image blur prevention device operates such that an aimed direction of an optical device is continuously changed;

a varying portion which varies an operation speed of said image blur prevention device so that said image blur prevention device is capable of varying the aimed direction to follow objects which move at different speeds; and control means for starting operation of said image blur prevention device in the second operation mode in response to an output signal of said signal output circuit.

2. An apparatus according to claim 1, further comprising a memory which stores information relating to an operation of said image blur prevention device, wherein a content of said memory may be rewritten with information input from at least one other source, and wherein said memory comprises means for storing information relating to an operation different from image blur prevention.

3. An apparatus according to claim 2, wherein said image blur prevention device is operable such that a photographing direction of a camera is continuously changed based on the information stored in said memory.

4. An apparatus according to claim 1, further comprising a memory which stores information relating to an operation of said image blur prevention device, wherein a content of said memory may be rewritten with information input from at least one other source, and wherein said memory comprises means for storing information relating to a manner of movement of said image blur prevention device, and said varying portion comprises means for causing said image blur prevention device to operate according to the manner of movement information stored in said memory.

5. An apparatus according to claim 4, wherein said memory comprises means for storing information relating to a direction of operation of said image blur prevention device, and said varying portion comprises means for causing said image blur prevention device to operate according to the direction information stored in said memory.

6. An apparatus according to claim 4, wherein said memory comprises means for storing information relating to a speed of operation of said image blur prevention device, and said varying portion comprises means for causing said image blur prevention device to operate according to the speed information stored in said memory.

7. An apparatus according to claim 2, wherein said memory comprises means for changing the stored content of said memory by a user of the apparatus.

8. An apparatus according to claim 7, wherein the stored content of said memory is changed in accordance with information input by the user related to the operation of said image blur prevention device.

9. An apparatus according to claim 1, further a memory which stores information relating to an operation of said image blur prevention device, wherein a content of said memory may be rewritten with information input from at least one other source and, wherein said varying portion comprises means for starting an operation of said image blur prevention device based on information stored in said memory of said image blur prevention device in accordance with an operation for performing photography.

10. An apparatus adapted to an image blur prevention device and including a signal output circuit which outputs a signal for starting a photographing operation, the apparatus comprising:

a setting portion that selectively sets said image blur prevention device in a first operation mode and a second operation mode, wherein in the first operation mode said image blur prevention device performs image blur prevention, and wherein in the second operation mode said image blur prevention device operates such that an aimed direction of the apparatus is continuously changed;

a varying portion which varies an operation speed of said image blur prevention device so that said image blur prevention device is capable of varying the aimed direction to follow objects which move at different speeds; and control means for starting operation of said image blur prevention device in the second operation mode in response to an output signal of said signal output circuit.

11. An optical equipment to which an image blur prevention device is adapted, said optical equipment comprising:

a signal output circuit which outputs a signal for starting a photographing operation;

a setting portion that selectively sets said image blur prevention device in a first operation mode and a second operation mode, wherein in the first operation mode said image blur prevention device performs image blur prevention, and wherein in the second operation mode said image blur prevention device operates such that an aimed direction of the optical equipment is continuously changed;

a varying portion which varies an operation speed of said image blur prevention device so that said image blur prevention device is capable of varying the aimed direction to follow objects which move at different speeds; and control means for starting operation of said image blur prevention device in the second operation mode in response to an output signal of said signal output circuit.

12. A camera to which an image blur prevention device is adapted, said camera comprising:

a signal output circuit which outputs a signal for starting a photographing operation;

a setting portion that selectively sets said image blur prevention device in a first operation mode and a second operation mode, wherein in the first operation mode said image blur prevention device performs image blur prevention, and wherein in the second operation mode said image blur prevention device operates such that an aimed direction of the camera is continuously changed;

a varying portion which varies an operation speed of said image blur prevention device so that said image blur prevention device is capable of varying the aimed direction to follow objects which move at different speeds; and control means for starting operation of said image blur prevention device in the second operation mode in response to an output signal of said signal output circuit.

13. An apparatus according to claim 1, wherein said signal output circuit comprises means for generating said output signal in accordance with an operation of a release operation portion of the camera.

14. An apparatus according to claim 1, wherein said signal output circuit comprises determination means for determining arrival of an object at a predetermined position in a photographing image plane and means for outputting said output signal in response to a determination that the object has arrived at the predetermined position in the photographing image plane.

15. An apparatus according to claim 14, wherein said determination means comprises means for determining arrival of the object in a predetermined focusing area in a photographing image plane.

16. An image blur prevention apparatus adapted for use with a camera including a signal output circuit which outputs a signal for starting a photographing operation and operating image blur prevention means in a first direction and a second direction for preventing image blur, said apparatus comprising:

image blur prevention operation control means for causing said image blur prevention means to perform an image blur prevention operation in the first direction and the second direction in accordance with an output of vibration detection means for detecting a vibration state of said camera and a predetermined operation control signal used for operating said image blur prevention means and stored in a predetermined memory, wherein in the first direction, said image blur prevention operation control means operates said image blur prevention means in response to both the output of said vibration detection means and said predetermined operation control signal stored in said memory, and in the second direction said image blur prevention operation control means performs at least an operation control for operating said image blur prevention means in an operation mode not in response to said predetermined operation control signal but in response to the output of said vibration detection means; and operation control start means for starting operation control in said operation mode of said image blur prevention operation control means in response to an output signal of said signal output circuit.

17. An apparatus according to claim 16, wherein said signal output circuit comprises means for generating said output signal in accordance with an operation of a release operation portion of the camera.

18. An apparatus according to claim 16, wherein said signal output circuit comprises determination means for determining arrival of an object at a predetermined position in a photographing image plane and means for outputting said signal in response to a determination that the object has arrived at the predetermined position in the photographing image plane.

19. An apparatus according to claim 18, wherein said determination means comprises means for determining arrival of the object in a predetermined focusing area in a photographing image plane.

20. An apparatus according to claim 16, wherein said image blur prevention operation control means comprises means for causing said image blur prevention means to perform an image blur prevention operation in response to a composite signal provided by addition of an output signal corresponding to the vibration state of said camera and the signal stored in said memory.

21. An apparatus according to claim 16, wherein in said operation mode, said image blur prevention operation control means comprises means for causing said image blur prevention means to perform an image blur prevention operation in the first direction in response to both an output of first vibration detection means for detecting a vibration state in the first direction and the signal stored in said memory, and to perform an image blur prevention operation in the second direction in response to an output signal of second vibration detection means for detecting a vibration state in the second direction.

22. An apparatus according to claim 16, wherein said image blur prevention means comprises means for correcting image blur.

23. An apparatus according to claim 16, wherein said memory comprises means for storing an operation control signal for causing said image blur prevention means to operate such that an aimed direction of said camera is continuously changed.

24. An apparatus according to claim 16, wherein said memory comprises means for varying stored information.

* * * * *

UNITED STATES PATENT AND TRADEMARK OFFICE
CERTIFICATE OF CORRECTION

PATENT NO. : 5,826,115

DATED : October 20, 1998

INVENTOR(S) : KOICHI WASHISU, ET AL.

Page 1 of 3

It is certified that error appears in the above-identified patent and that said Letters Patent is hereby corrected as shown below:

COLUMN 1,
Line 28, "manupulation," should read --manipulation,--; and
Line 33, "and" (first occurrence) should read --and,--, and "and," (second occurrence) should read --and--.

COLUMN 2,
Line 35, "camera-shakes" should read --camera shakes--.

COLUMN 3,
Line 5, "as" should be deleted; and
Line 61, "inventions." should read --invention.--.

COLUMN 5,
Line 29, "the the" should read --the--;
Line 44, "the the" should read --the--; and
Line 46, "threfore," should read --therefore,--.

COLUMN 6,
Line 1, "function, however," should read --function. However,--;
Line 36, "the" should be deleted; and
Line 50, "When," should read --When--.

COLUMN 7,
Line 45, "he" should be deleted.

UNITED STATES PATENT AND TRADEMARK OFFICE
CERTIFICATE OF CORRECTION

PATENT NO. : 5,826,115

DATED : October 20, 1998

INVENTOR(S): KOICHI WASHISU, ET AL.

It is certified that error appears in the above-identified patent and that said Letters Patent is hereby corrected as shown below:

COLUMN 8,
Line 42, "FIG. 1." should read --FIG. 1,--;
Line 56, "the the" should read --the--;
Line 59, "and" should read --and,--;
Line 60, "and," should read --and--; and
Line 66, "Accordingly," should read --Accordingly,--.

COLUMN 9,
Line 40, "embodiments.)," should read --embodiments.)--.

COLUMN 10,
Line 1, "signal release," should read --release signal,--;
Line 13, "bidirectional" should read --bi-directional--; and
Line 24, "at" should read --a--.

COLUMN 11,
Line 9, "providing," should read --outputting,--;
Line 14, "signal" should read --signal,--; and
Line 53, "fixed," should read --fixed position,--; and
Line 55, "and" (first occurrence) should read --an--.

UNITED STATES PATENT AND TRADEMARK OFFICE
CERTIFICATE OF CORRECTION

PATENT NO.  : 5,826,115

DATED       : October 20, 1998

INVENTOR(S) : KOICHI WASHISU, ET AL.

Page 3 of 3

It is certified that error appears in the above-identified patent and that said Letters Patent is hereby corrected as shown below:

COLUMN 12,
Line 17, "outputs," should read --outputs--;
Line 24, "input:" should read --input--;
Line 43, "155a" should read --155A--; and
Line 47, "from" should read --for--.

COVER PAGE [56] RC,
U.S. Patent Documents, "Canon" should read --Kawakami et al.--.

Signed and Sealed this

Sixth Day of July, 1999

Attest:

Q. TODD DICKINSON

Attesting Officer

Acting Commissioner of Patents and Trademarks